(12) United States Patent
Das Sharma

(10) Patent No.: US 10,880,137 B2
(45) Date of Patent: Dec. 29, 2020

(54) BYPASSING EQUALIZATION AT LOWER DATA RATES

(71) Applicant: Intel Corporation, Santa Clara, CA (US)

(72) Inventor: Debendra Das Sharma, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 460 days.

(21) Appl. No.: 15/721,518

(22) Filed: Sep. 29, 2017

(65) Prior Publication Data

US 2018/0331864 A1 Nov. 15, 2018

Related U.S. Application Data

(60) Provisional application No. 62/505,619, filed on May 12, 2017.

(51) Int. Cl.
*H04L 27/01* (2006.01)
*H04L 25/03* (2006.01)

(52) U.S. Cl.
CPC .............. *H04L 27/01* (2013.01); *H04L 25/03* (2013.01)

(58) Field of Classification Search
CPC ..... H04L 25/03; H04L 27/01; G06F 13/4226; G06F 16/901; G06F 2213/0026
See application file for complete search history.

(56) References Cited

U.S. PATENT DOCUMENTS

| | | | |
|---|---|---|---|
| 10,148,508 B1 * | 12/2018 | Sedarat | ............... H04L 12/40 |
| 2004/0071219 A1 | 4/2004 | Vorenkamp et al. | |
| 2004/0213361 A1 * | 10/2004 | Chen | .................. H04L 25/0202 |
| | | | 375/340 |
| 2005/0251595 A1 * | 11/2005 | Lesartre | ............... H04L 1/1829 |
| | | | 710/71 |
| 2009/0245110 A1 * | 10/2009 | Connolly | ................. H04L 25/03 |
| | | | 370/236 |
| 2012/0044983 A1 | 2/2012 | Kerr | |
| 2013/0051483 A1 | 2/2013 | Wyatt et al. | |
| 2014/0269884 A1 * | 9/2014 | Tennant | ............ H04L 25/03885 |
| | | | 375/232 |
| 2014/0281067 A1 * | 9/2014 | Das Sharma | ..... H04L 25/03159 |
| | | | 710/104 |
| 2015/0249558 A1 | 9/2015 | Aguilar-Arreola et al. | |
| 2016/0087816 A1 | 3/2016 | Patel et al. | |

OTHER PUBLICATIONS

PCT International Preliminary Report on Patentability issued in International Application No. PCT/US2018/032441, dated Nov. 12, 2019; 11 pages.

PCT International Search Report and Written Opinion issued in International Application No. PCT/US2018/032441, dated Sep. 12, 2018; 12 pages.

* cited by examiner

*Primary Examiner* — Syed Haider
(74) *Attorney, Agent, or Firm* — Alliance IP, LLC

(57) ABSTRACT

A port of a computing device is to connect to another device over a link and use equalization logic to perform equalization of the link at a plurality of different data rates. The equalization logic may identify that the other device supports bypassing a sequential equalization mode, determine a maximum data rate supported by the devices on the link, and participate in equalization of the link at the maximum supported data rate before equalizing the link at one or more other data rates lower than the maximum supported data rate in the plurality of data rates.

25 Claims, 17 Drawing Sheets

| Symbol No | Ordered Set |
|---|---|
| 0 | COM |
| 1 | Link Number |
| 2 | Lane Number |
| 3 | N_FTS |
| 4 | Data Rate Identifier |
| 5 | Training Control<br>Bit 0 – Hot Reset<br>Bit 1 – Disable Link<br>Bit 2 – Loopback                *1105*<br>Bit 3 – Disable Scrambling<br>Bit 4 – Compliance Receive<br>Bit 5 – Equalization Skip Support<br>      1b indicates support for EQ skip;<br>      0b indicates no support for EQ skip<br>Bits 6:7 – Reserved |
| 6 | D10.2 for Standard TS1<br>EQ TS1:<br>      Bit 2:0 – Rx preset Hint<br>      Bit 6:3 – Tx Preset<br>      Bit 7 – Set to 1b |
| 7 | D10.2 |
| 8 | D10.2 |
| 9 | D10.2 |
| 10 | D10.2 |
| 11 | D10.2 |
| 12 | D10.2 |
| 13 | D10.2 |
| 14 | D10.2 |
| 15 | D10.2 |

*FIG. 11*

BYPASSING EQUALIZATION AT LOWER DATA RATES

RELATED APPLICATIONS

This application claims benefit to U.S. Provisional Patent Application Ser. No. 62/505,619, filed May 12, 2017 and incorporated by reference herein in its entirety.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 11 illustrates a representation of an example ordered set.

DETAILED DESCRIPTION

Figure 1:
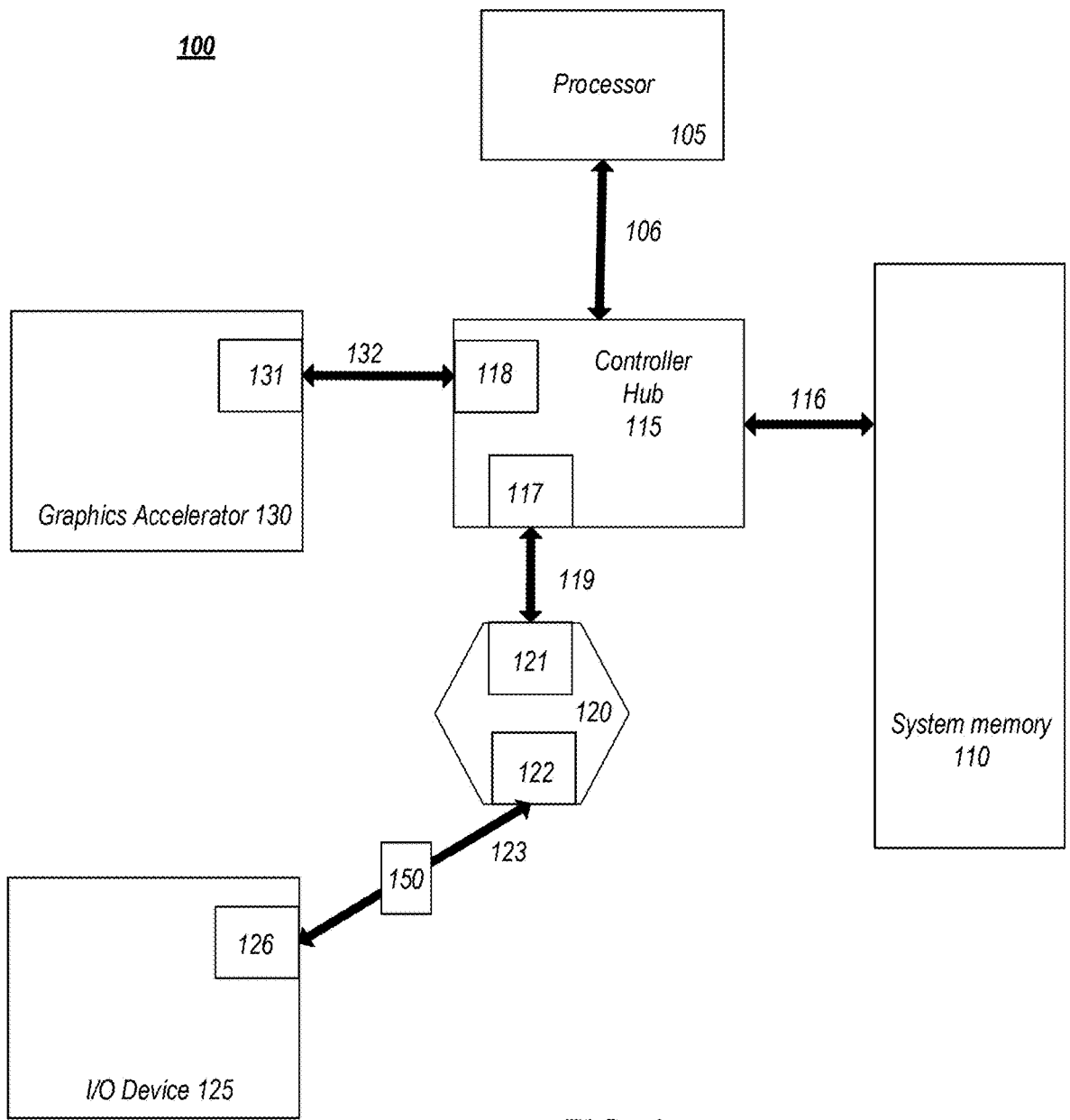
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
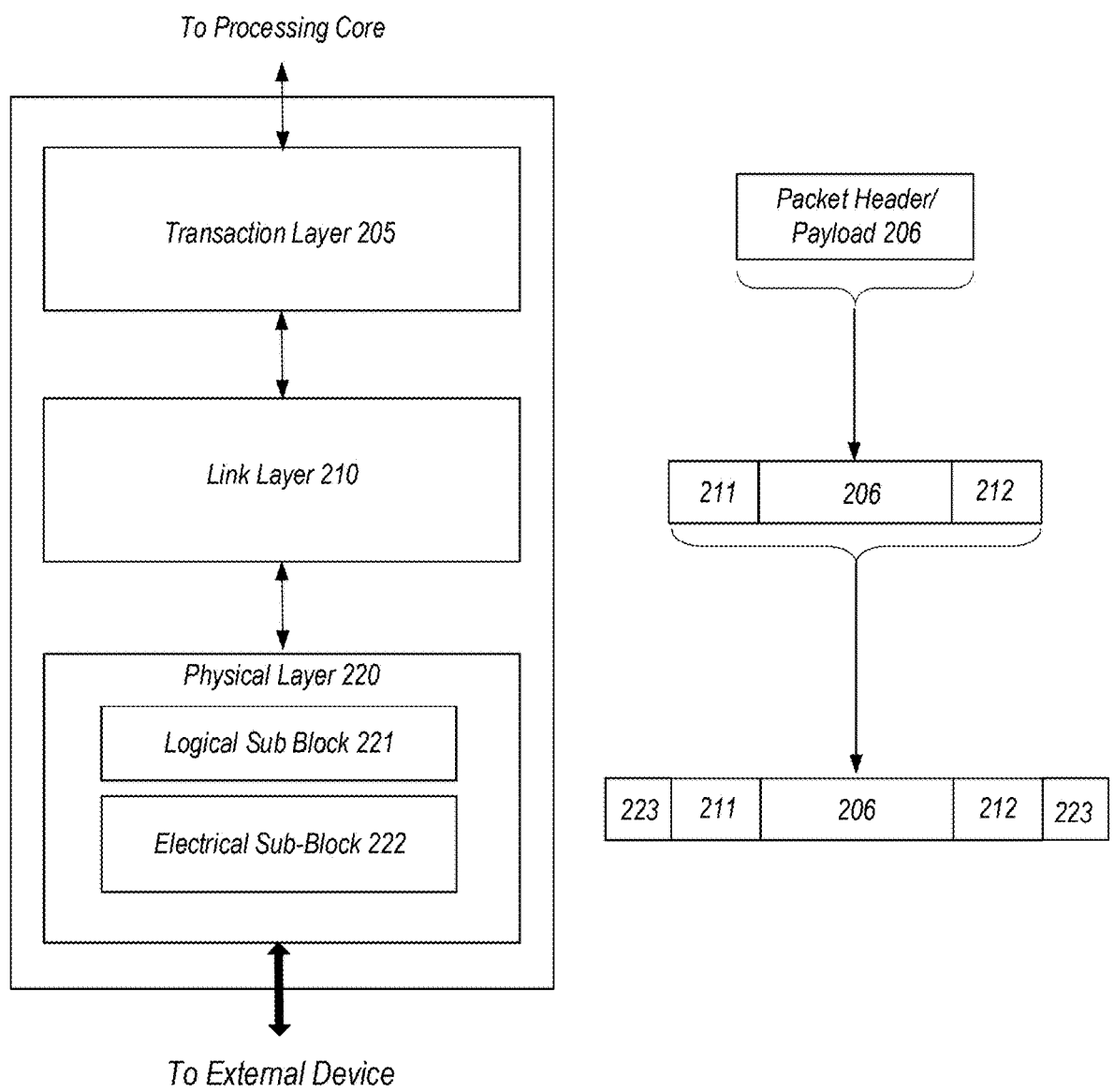
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
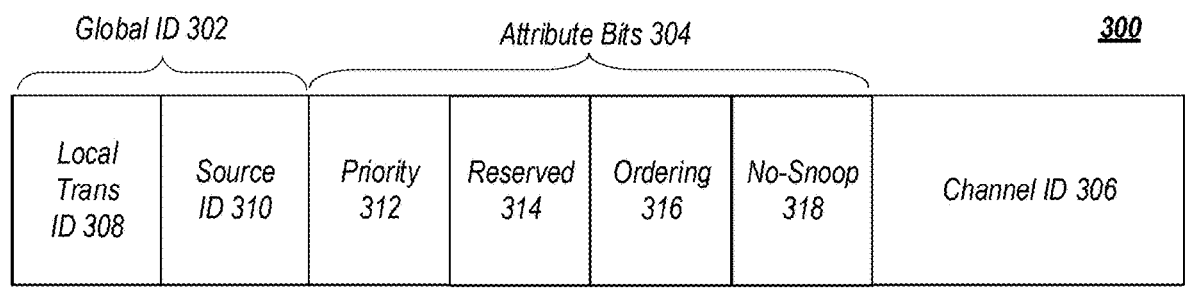
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
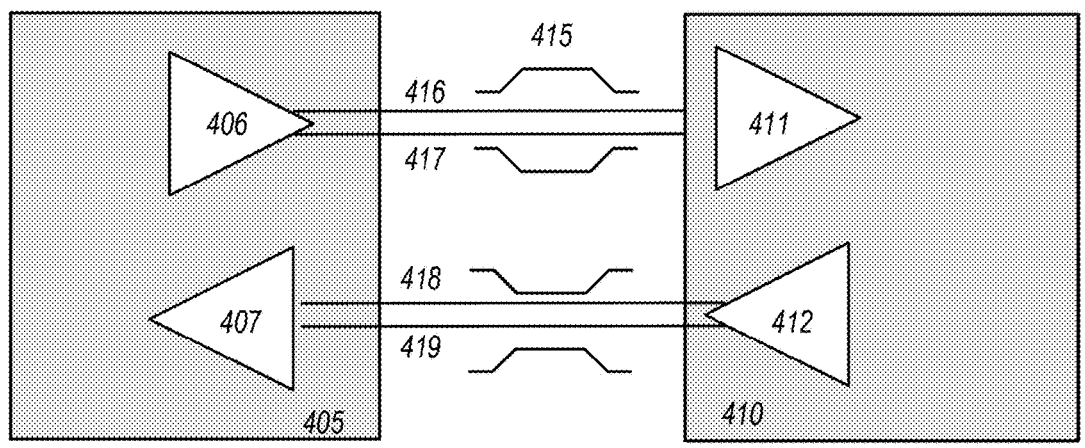
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Systems may be provided, which run various protocols over pins and physical layer (or PHY) defined according to another protocol. For instance, various non-PCIe protocols (e.g., Ethernet, Infiniband, Universal Serial Bus, and others known, future, and/or proprietary protocols) may be run on top of and using a PCIe physical layer (e.g., pins and logical PHY). Such implementations may be provided, for instance, to support a wide range of applications. Such applications may include, for instance, data center applications including accelerators with coherency and memory semantics, memory dis-aggregation and pooling with memory semantics, smart I/O devices, and field programmable array (FPGA)-based devices. The PHY, such as a PCIe PHY, may be selected and leveraged for other protocols (e.g., the higher-layers of these other protocol stacks including such higher layers as link layers, transaction layers, protocol layers, etc.) on the basis that the PHY offers the advantages of an established, widely adopted interconnect ecosystem including the abundance of low-power/low-latency intellectual property (IP) computing blocks and bus functional models (BFMs), backwards compatible speed upgrades to allow the ecosystem to evolve over time, a robust compliance program, a rich set of connector topologies (e.g., CEM, SFF 8639, M.2, cable, etc.), variable widths, partitionable links for flexibility, well established channel model along with channel extenders such as retimers, among other example benefits. For instance, the PHY may facilitate the ability to offer the choice of either the native protocol (e.g., PCIe) or accelerator slot without over-provisioning pins on package or slots on board for dedicated proprietary protocols (e.g., versus) PCIe, which may cause potential customer confusion.

In some example systems, bus logic (e.g., implemented in circuitry (or other hardware), firmware, and/or software) may be provided, which implements a particular physical layer of a first protocol and the higher-level layers for multiple different protocols, which may each run on top of the physical layer of the first protocol. These multiple different protocols may include the first protocol, with the bus logic supporting the entire protocol stack of the first protocol. In one example, the bus logic may enable these multiple different protocols to be dynamically multiplexed over the common PHY.

Figure 5:
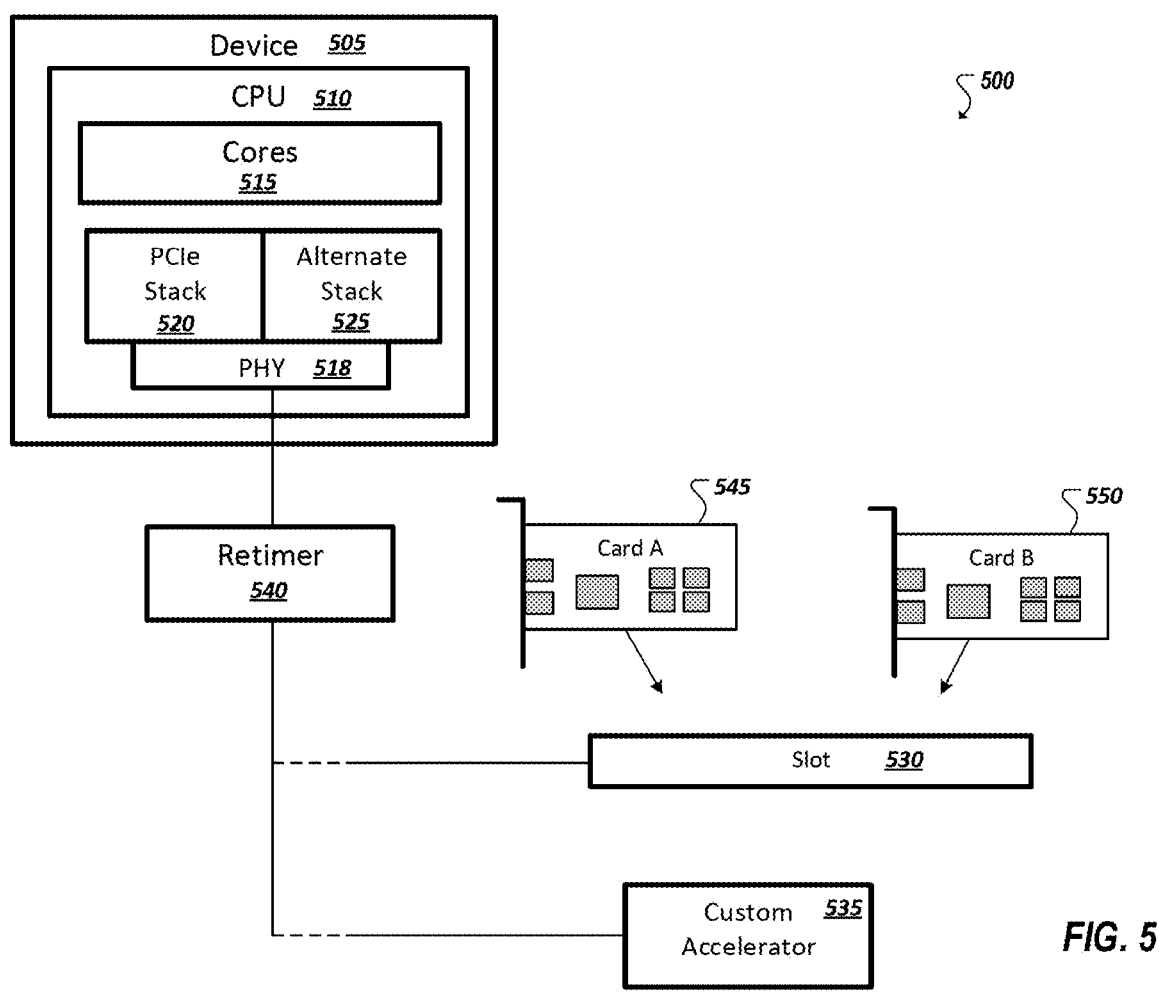
FIG. 5 illustrates a simplified block diagram of an example system.

In one implementation, the bus logic may utilize a PCIe PHY (e.g., PCIe Gen 5.0 PHY) and support not only native PCIe protocols but also one or more additional protocols (to run on the PCIe PHY), including coherency, memory, and I/O protocols, among other examples. For instance, as shown in the simplified block diagram 500 of FIG. 5, a device 505 may be provided that includes a processor 510 with one or more processor cores 515 and bus logic 518 to implement a common PHY (of a first protocol) on which two or more different higher level protocol stacks 520, 525, etc. (e.g., link layer and higher) may run. For instance, the common PHY may be implemented according to a base protocol, and one of the link protocol stacks (e.g., 520) may embody logic to implement the remaining layers of the base protocol. Additional link protocol stacks (e.g., 525) may be provided according to another, different protocol. Multiplexer logic (e.g., implemented in circuitry or other hardware-implemented logic) may be provided on the bus to select or activate one or more of the link protocol stack logic blocks 520, 525 (e.g., based on a protocol negotiation performed between the device 505 and other devices (e.g., 530, 535, 540, etc.) on the link. Additionally, in some cases, multiple link protocol stack logic blocks may be activated and used concurrently on the same link, with multiplexer logic being used to multiplex between the multiple protocols on the same lanes of the link, among other example features.

The device 505 may utilize ordered sets to negotiate protocols to be used on the link with one or more other devices (e.g., 530, 535, 540). For instance, a flexible connector or slot device 530 may be provided, which may be configured to accept multiple card devices (e.g., 545, 550), which may each support and implement an I/O interface and protocol stack block corresponding to a respective interconnect protocol. For instance, a first one of the devices 545 may support a first protocol (e.g., also supported by the device 505 and implemented using protocol stack block 520) and a second one of the devices 550 may support a second protocol (e.g., supported by the device and implemented using protocol stack block 525), etc. In other instances, a custom device 535, such as an accelerator device, may be provided, which itself possesses multiple protocol stack logic blocks to support communication using any one of multiple interconnect protocols (which may run on top of the PHY of a base protocol (e.g., PCIe)). Some devices, which may connect to the first device by way of such a multi-protocol port may be hot-pluggable devices. Still further, extension devices, such as retimers, redrivers, and repeaters may be provided to extend the physical length of the link connecting two of the devices (e.g., 505 and 530 or 505 and 535, etc.). For instance, a retimer 540 may be provided and may itself implement at least partial protocol stack logic to enable the retimer 540 to participate (at least partially) in training of the link. Accordingly, in some instances, a retimer (e.g., 540) may be equipped with logic to consume some link training ordered sets, including those used in alternate protocol negotiation. In some implementations, the negotiation of the protocol(s) to be employed may be performed during initial PHY link training, using (or based on) the link training protocol of the PHY's protocol (e.g., PCIe), among other example implementations.

In some implementations, such as introduced above, a system supporting multiple different interconnect protocols to run on top of a PCIe PHY, may utilize initial PCIe link training to determine the protocols to support. For instance, in one example, protocol may be negotiated in an early generation (e.g., lower) data rate, such as a PCIe Gen 1 data rate, during training with enhanced training sets (TSes) being used to communicate support protocols and perform handshaking to determine the protocols supported by the devices on the link (e.g., the two endpoint devices and any extension devices (e.g., retimers, redrivers, repeaters, etc.) provided between the two endpoints on the link. In another example, SKP ordered sets (OSes) (e.g., as defined in PCIe Gen 4.0) may be utilized to define and negotiate the protocol that is to be used, as the devices train the link. For instance, in systems supporting higher generation speeds (e.g., PCIe Gen 4.0) vendor defined fields defined within symbols of a control SKP OS may be used to perform protocol negotiation, among other example implementations. This negotiation may permit the dynamical selection and use of potentially one of many supported protocols (e.g., to be run top of a PCIe PHY), providing a system with more flexibility than approaches that define the protocol in an a priori manner (e.g., through a proprietary PCIe based register set by system software, etc.). Fixed protocol solutions, however, among other example considerations, may have limited utility in applications that are to provide an open slot, as fixed protocols may limit the usages to closed systems.

Additionally, in some implementations, a system supporting multiple different protocols may support multiple different modes for equalizing links built on the PCIe PHY layer provided by the devices on the link. For instance, an interconnect protocol used in communications on the link may support multiple defined data rates. In a default mode of equalization, the link is to be equalized at each of the multiple data rates in sequence until it reaches a highest one of the data rates that all of the devices on the link stably support. This default mode of equalization, or sequential equalization, may be replaced in some instances, by an alternate mode of equalization that bypasses equalization of one or more (or all) data rates lower than the highest common data rate supported by all devices on the link (as determined from the devices advertising the highest data rate they each respectively support). A sequential equalization bypass mode may allow for quicker equalization, and therefore quicker initial link training, which may be beneficial in some application (e.g., hot plug flows, deep power savings, and other latency sensitive implementations), among other example advantages.

Figure 6:
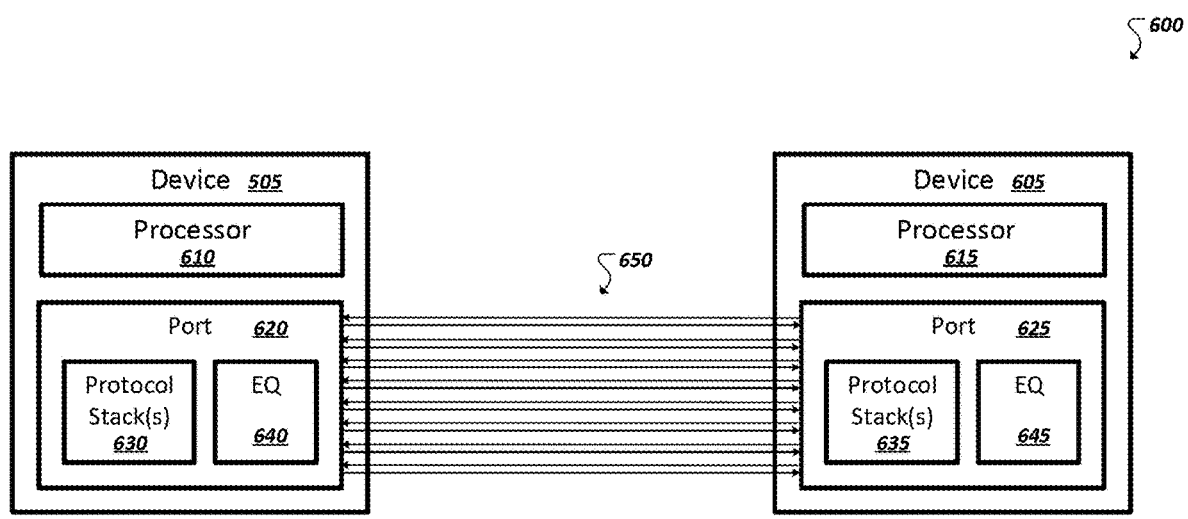
FIG. 6 is a diagram illustrating example devices connected using a link.

Turning to the simplified block diagram 600 of FIG. 6, a system is illustrated of a first device 505 connected to a second device 510 using an interconnect 650 made up of multiple, physical bidirectional communication lanes. One or more of the devices 505, 605 may include respective processing hardware (e.g., 610, 615). In some implementations, one of the devices may be a main or central processor, or a bridge, hub, root port, or other component supporting communication with a central processor. Each of the device 505, 605 may include one or more ports (e.g., 620, 625), which may be used by the device 505, 605 to couple to the interconnect 650 and communicate with other devices using one or more interconnect protocols over the link. In some implementations, ports (e.g., 620, 625) may be equipped with interconnect protocol logic (e.g., 630, 635) implemented as a stack (e.g., physical layer, link layer, transaction layer, protocol layer, etc.). The protocol logic 630, 635 may enable the devices 505, 605 to participate in link training according to one or more interconnect protocols to establish a protocol-compliant link between respective ports (e.g., 620, 625) of the devices. Training of a link may include equalization of the link to set parameters of the transmitter and receiver such that particular defined and measurable parameters of the link are met to assure suitable quality of the link (e.g., such that data may be sent with minimal bit errors at a particular data rate). Accordingly, a port (e.g., 620, 625) may be provided with equalization logic (e.g., 640, 645), implemented in hardware circuitry, firmware, and/or software, which may be used to participate (e.g., with other devices on the link) in equalizing the link for substantive data communications (e.g., in an operational link state). As noted above, equalization logic may support equalization at any one of multiple data rates defined for a particular interconnect protocol capable of being used on a link compliant with the particular protocol. Further, as discussed in detail herein, equalization logic may additionally multiple alternative equalization modes, including a sequential equalization mode and a sequential equalization bypass mode, among other examples. The system in the example of FIG. 6 may additionally provide for marginal link detection to enable the detection of errors and poor performing lanes of a link. Determining a marginal link may result in the data rate of the link being downgraded (e.g., using equalization logic (e.g., 640, 645) and/or protocol stack logic (e.g., 630, 635)). The mechanism used to downgrade the data rate may depend on the equalization mode used to establish the operational link. Further, in some implementations, system software or other controller logic may be provided to assist the link during such downgrades, such as by halting traffic or quiescing traffic on the link (e.g., to protect against transaction time-outs) and provide other example functionality.

The proposed invention enables a faster way to link train in PCI Express (PCIe), particularly as new generations of the interconnect are developed and the corresponding data rates continuously increase. Traditionally, to transition to a higher-speed data rate, the agents of the devices connected on the link may begin at the lowest defined data rate (e.g., 2.5 GT/s in PCIe Gen1 or 5 GT/s in PCIe Gen2) and then progressive re-equalize for each of the higher data rates until the devices either cannot successfully equalize to one of the data rates or successfully equalize to the highest, or maximum, defined data rate (e.g., 32 GT/s at PCIe Gen5 or higher data rates in newer PCIe generations). For instance, as shown in the block diagram 700 of FIG. 7, in one example interconnect protocol may define a set of supported data rates corresponding to generations of the protocol. As the protocol evolves and is improved upon, new generations of the interconnect's specification may be defined, together with a new (higher) data rates supported by the improvement introduced through the new generation. For instance, in the particular example of FIG. 7, a first generation (e.g., of PCIe) may define a data rate of 2.5 GT/s. This may represent the lowest active link data rate for the interconnect. Subsequent generations of the interconnect may introduce and define support of additional, higher data rates, such as a second generation rate of 5.0 GT/s (710), a third generation rate of 8.0 GT/s (715), a fourth generation rate of 16 GT/s, a fifth generation rate of 32 GT/s, and so on. Further, it should be appreciated that other (e.g., non-PCIe) interconnects may have different enumerations of generations supporting different defined data rates than those illustrated in the particular example of FIG. 7.

Figure 8:
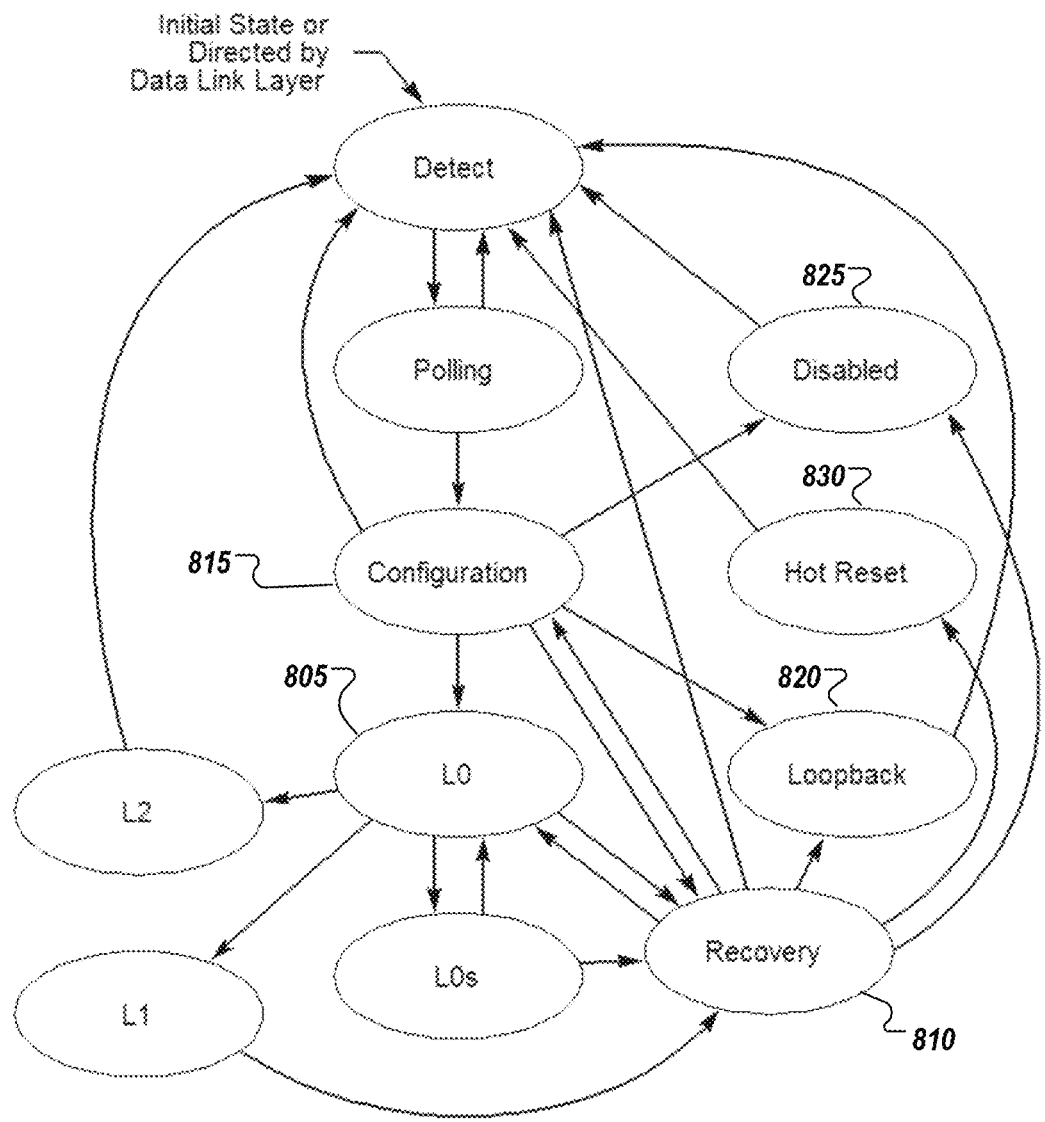
FIG. 8 is a diagram illustrating an example link training state machine.

Generally, link equalization may enable the component devices on the link to adjust their respective transmitter and receiver setup of each lane to improve the signal quality and meet the parameters defined for the link (e.g., for each respective data rate defined for the link (e.g., by a corresponding interconnect specification)). The transmitter and receiver for each lane of the link that is associated with the link training state machine governing training of the link (e.g., including those lanes which are operational or which may become operation due to link up-configure) may participate in the equalization procedure. Equalization may be performed at each data rate change. FIG. 8 illustrates a representation of one example of a link training state machine 800, such as a PCIe link training and status state machine (LTSSM). The target parameters to be met through equalization may correspond to the transmitter setup for all or a set of the operating conditions the transmitter may encounter in the future when the link is up. In some implementation, as equalization is performed between each data rate change, the transmitter setup determined at each data rate change may be stored and not only used to support the ultimate data rate used on the link, but also in cases where the data rate is to be downgraded (e.g., in response to detecting a marginal link or other substandard condition on the link), such that the stored setup for a lower speed may be automatically applied within the need for another equalization of the link for the lower speed. Further, equalization may include the tuning of the respective receiver setups for each lane. In some cases, component devices may be permitted to fine-tune their receiver setup even after the equalization procedure is complete as long as doing so does not cause the link to be unreliable (e.g., do not meet the defined parameters for link quality).

Equalization may be initiated either autonomously or by software. In some cases, equalization may be performed after or upon transitioning to an active link state (e.g., L0 (905)). After entering L0, in some implementations, component devices on the link may be forbidden from transmitting data (e.g., link layer packets) if the equalization procedure remains to be performed and until the equalization procedure completes. In some cases, to perform equalization, the components may transition from L0 to a Recovery (or other) link state (e.g., 810) to change the data rate and perform the equalization procedure corresponding to the new data rate. In such examples, in a Recover state, the transmitting and receiving devices are to each send and receive data using the configured link and lane numbers (e.g., as determined in a preceding link training state (e.g., Configuration state (e.g., 815)) as well as the previously supported data rate(s). Recovery 810 allows a configured link to change the data rate of operation if desired, re-establish bit lock, symbol lock, or block alignment, and perform lane-to-lane de-skew, among other example tasks and features. In the example of FIG. 8, components may transition from a Recovery state 810 back into an active link state (e.g., L0 805), or into a Loopback 820, Disabled 825, Hot Reset 830, or Configuration state 815, among other example implementations.

In some implementations, equalization may be defined to require that the equalization process run for a set amount of time (e.g., 100 msec). For implementations where no set time is defined, equalization may nonetheless involve a relative large time to effectively configure and ascertain the transmitter and receiver setups needed to meet the required parameters defined in an interconnect for a link supporting a particular data rate. Since equalization is unique for each data rate, it may be performed sequentially for each of the data rates. Accordingly, when equalizing sequentially from a lowest data rate to a highest data rate, the equalization process may be performed several times in sequence, with the resulting latency effectively equal to at least the time used for each equalization multiplied by the number of data rate changes to progress to the highest achievable data rate for a given link. For instance, in an example such as PCIe, to transition from Gen1 to Gen5 a total of 300 msec or longer may be used. Further, as interconnects evolve and add generations and levels of data rates, still further equalization steps may be introduced, worsening what can be suboptimal latency introduced through equalization.

Figure 7:
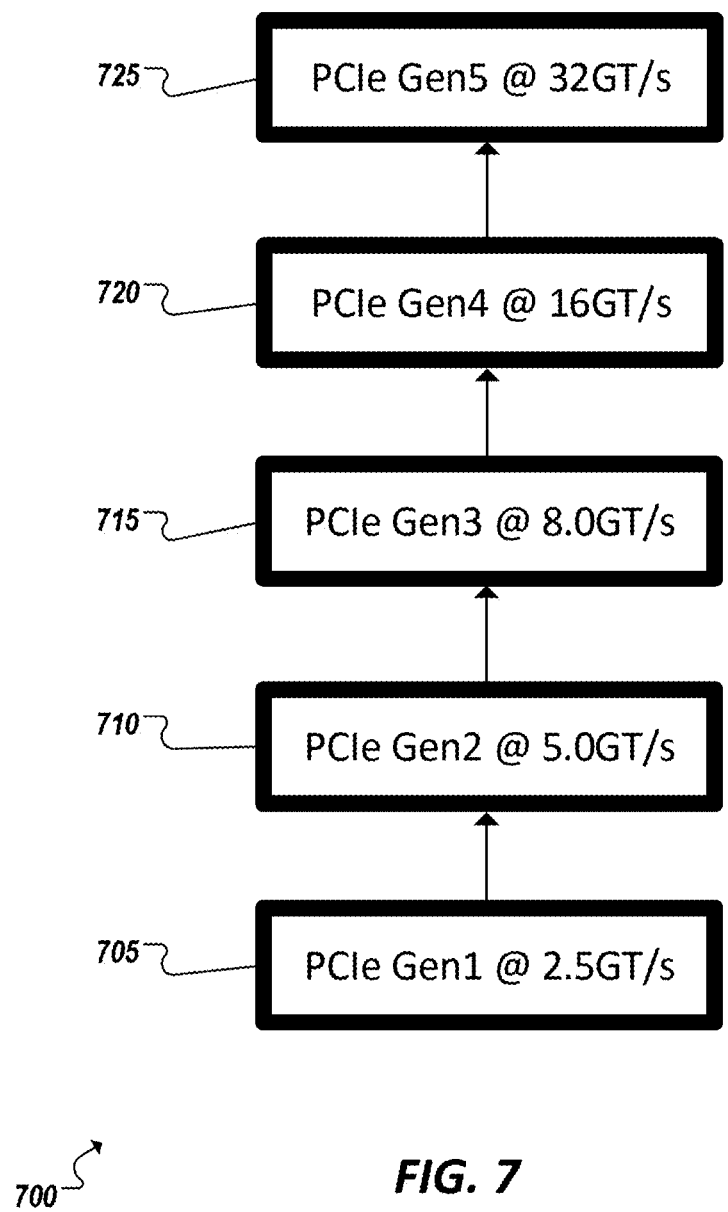
FIG. 7 is a diagram illustrating data rates defined in an example interconnect protocol.
Figure 9:
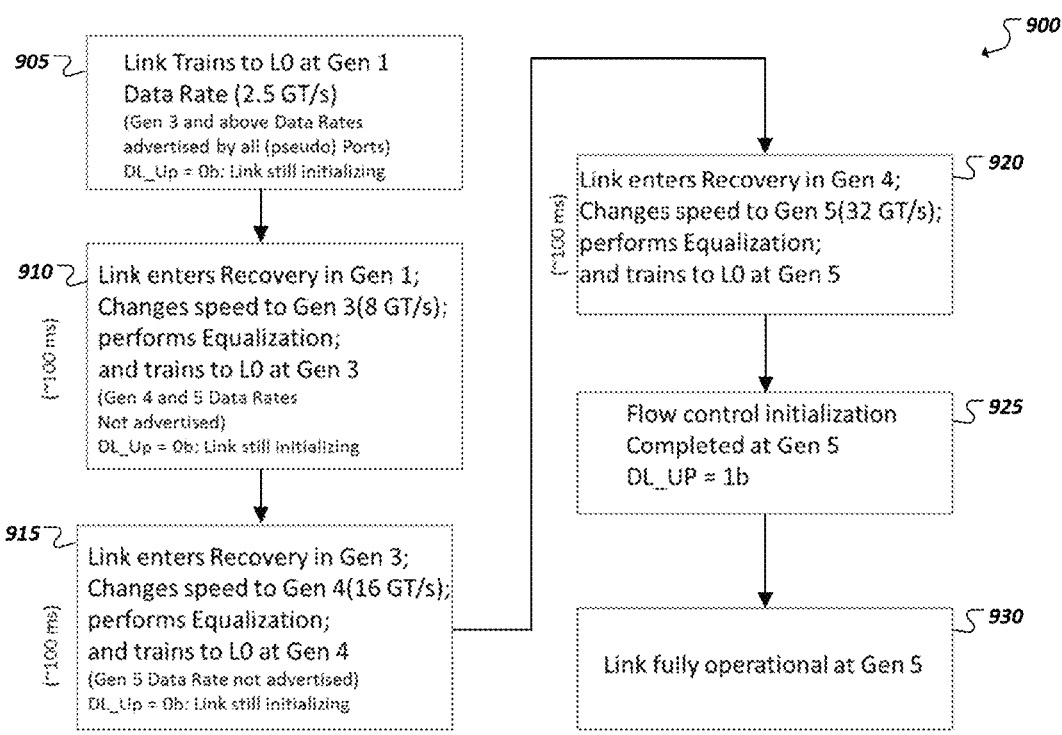
FIG. 9 is an example flowchart illustrating sequential equalization of a link.

For instance, in the example of PCIe, equalization may be performed sequentially for each of the data rates above Gen 2, as shown in the example flowchart 900 of FIG. 9. For instance, a link may be initially trained 905 (e.g., by the devices connected using the link and progressing through a link training state machine (e.g., as illustrated in FIG. 7)) to the active link state L0 at a Gen1 data rate (e.g., 2.5 GT/s). During the training of the link in Gen1, the devices may each advertise the highest respective data rate supported by the device, such that the maximum potential data rate for the link may be determined. In the example of FIG. 9, PCIe may allow the data rate to increase directly from a Gen1 data rate to a Gen3 data rate (e.g., as equalization is not performed in PCIe to achieve the Gen2 data rate). To change the speed to the Gen3 data rate (e.g., 8 GT/s), the devices may cause the link to enter a Recovery state at the Gen1 data rate. Equalization may then be performed (at 910) (e.g., with equalization substates of the Recovery state) and, if successful, the link may be trained to L0 at the Gen3 data rate. The parameters of the transmitters and receivers used to achieve equalization of the link at the Gen3 data rate may be stored in memory to be later accessed in the event a downshift of the link back to Gen3 (e.g., from a Gen4 data rate). If the Gen3 data rate is the maximum data rate supported on the link, training may end here (e.g., and set DL_UP=1b to indicate that the data link layer is up and that data is ready for transmission in L0), otherwise training continues by again entering recovery (at 915) at the Gen3 data rate to change the speed to the Gen4 data rate (e.g., 16 GT/s) and perform equalization of the link to determine whether operation at the Gen4 data rate may be maintained on the link. If equalization (at 915) is successful it may be determined whether the Gen4 data rate is the highest supported data rate to determine whether the sequential equalization should continue to the Gen5 data rate (e.g., 32 GT/s) (at 920) and so on until either equalization is unsuccessful (resulting in the highest equalized data rate being adopted for the link) or the equalization at the highest supported data rate has succeeded. When the highest successfully equalized data rate is achieved, flow control initialization may be completed (e.g., at 925) and the data link layer may indicate (e.g., by setting DL_UP=1b) that the link is ready for data transmission and is fully operational (e.g., at 930).

By sequentially equalizing at each of the supported, incremental data rates, considerable latency is added to the link training time during which there is no input/output. While this may be acceptable in some application, this effect may be more impactful or pronounced in other applications such as a flexible interconnect bus, where multiple different protocols may run on and be multiplexed on a common physical layer, such as in the example of FIG. 5. Further, some application may allow resources (e.g., a particular device or other system component) to be moved around multiple server nodes by invoking hot-plug flows between the shared resources and the compute nodes. In implementations, such as shown in the example of FIG. 9, where equalization is performed sequentially, the emergence of marginal links following training may be easily dealt with as the devices may simply cause the link to downshift to one of the already equalized, lower data rate (i.e., the next lowest data rate) without having to equalize the link and stall traffic with consequences such as time outs, among other effects. Downshifting the data rate may also be accomplished dynamically to enable power savings, among other example reasons. The tradeoff in such an implementation is the lengthened system boot time or the time for hot-plug/link reset (e.g., in instances such as errors that needs to take the link down), among other examples.

Figure 10:
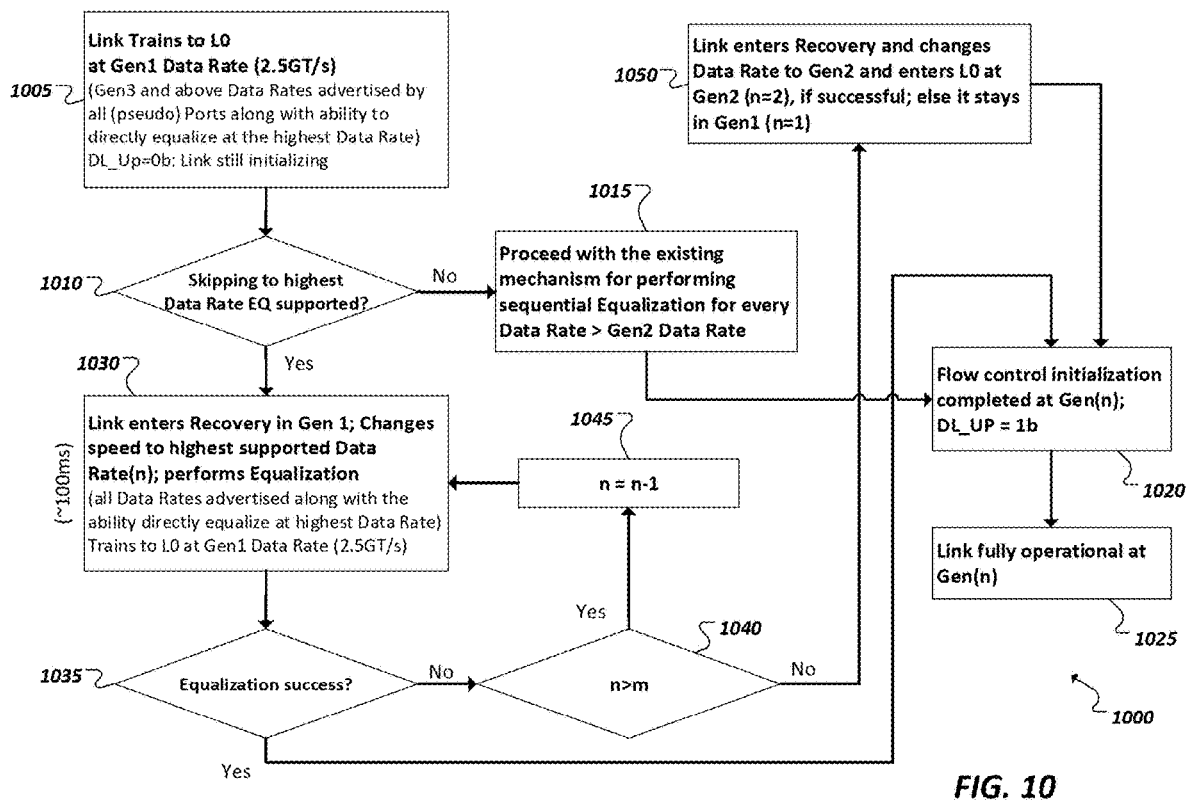
FIG. 10 is an example flowchart illustrating an example technique to bypass intermediate data rates during equalization.

In some implementations, such as hot plugged applications, it may be desirable to minimize the time to equalize to the highest data rate supported by all components on the link. For instance, upon determining the highest supported data rate, equalization may be performed only on this highest data rate (e.g., if it is above Gen 2). In this manner, faster link equalization may be achieved by bypassing equalization in the lower data rates and going straight to performing equalization in the highest common data rate (e.g., from Gen 1 speed). For instance, in the example shown in the flowchart 1000 of FIG. 10, the link may train 1005 to the L0 at the lowest, or a base, data rate (e.g., Gen1 2.5 GT/s). The component devices of the link may each advertise their highest supported data rates. The devices may likewise advertise whether they support sequential equalization bypass, such that the devices may operate to immediately bring the link to their highest mutually supported data rate and begin equalization at this highest speed. For instance, as shown in FIG. 10, the devices may determine (at 1010) whether sequential equalization bypass is supported. If one or more devices (e.g., an endpoint or extension device) advertises that it does not support sequential equalization bypass, the device may determine 1010 that sequential equalization is to be performed (e.g., as in the example of FIG. 9) and the devices may proceed with sequential equalization (at 1015) to bring the link to the highest successfully equalized data rate, complete flow control initialization (at 1020), and bring the link to a fully operational mode 1025 at the equalized data rate.

In other instances, all of the devices on a link may advertise that they support bypassing sequential equalization, to cause the link to enter recovery (at 1030) and immediately change the speed to the highest data rate supported by the collection of devices (e.g., corresponding to a particular one of the set of defined generations for which equalization is required (e.g., all generations at or above a generation m (e.g., m=Gen3 in PCIe))), for instance, by entering Recovery in Gen1 L0 (at 1030) and changing the speed directly from the Gen1 data rate (e.g., 2.5 GT/s) to the highest supported data rate and bypassing equalization for all intermediate data rates between Gen1 and the highest mutually supported data rate. Equalization may then be performed (at 1030) for the highest determined data rate. If equalization is successful (at 1035), initialization of the link may be completed 1020 and the link may be fully operational at the highest supported data rate.

If equalization of the highest supported data rate is unsuccessful (at 1035), it can be determined whether the highest supported data rate (e.g., current data rate corresponding to Gen n) is greater than the data rate of Gen m (at 1045). For instance, in one implementation of PCIe, Gen m may be Gen3 of PCIe, such that for any generation Gen4 or higher may result in the data rate being downshifted (at 1045) to the next lowest generation's data rate and equalization being retried (at 1030). For instance, if the devices determine (at 1005) that PCIe Gen5 is the highest mutually supported data rate, the devices may initially change the speed from the Gen1 data rate to the Gen5 data rate and attempt equalization of the link at the Gen5 speed. If equalization at the Gen5 data rate is unsuccessful, the devices may re-enter Recovery at the Gen1 data rate (at 1030) and change the L0 speed to the Gen4 data rate and retry equalization the Gen4. If equalization is successful at the Gen4 data rate initialization of the link may be completed at the Gen4 data rate. If equalization at the Gen4 data rate is unsuccessful (e.g., based on failing to attain the particular equalization parameters for Gen4), the devices may try one more time (for Gen3) to achieve successful equalization of the link at a speed above the Gen(m) (e.g., Gen2) data rate. In this example, if the equalization of the link at the Gen3 speed is also unsuccessful, the link may enter recovery (at 1050) and change the data rate to Gen2. If the transition to the Gen2 data rate is successful, the Gen2 speed may be adopted, else initialization of the link may be completed 1020 and entry into the fully operational state 1025 may take place at the base Gen1 data rate, among other examples.

In some implementations, ordered sets passed between the devices on the link during link training and initialization may be defined to be utilized to support sequential equalization bypass. As discussed above, sequential equalization bypass may enable equalization to be performed only at the highest common data rate of the components on the link (e.g., for PCIe, Gen 5 and beyond). Sequential equalization may be an optional feature, which the devices on the link (e.g., as directed by software or configuration registers) may elect to make use of (e.g., depending on the application in which the link is implemented). For instance, to enable sequential equalization bypass, the devices may first determine whether each other component on the link is capable of participating. Additionally, components may designate not only whether they can support sequential equalization, but also whether it is desired for the application, otherwise the devices may simply revert to performing equalization from the lowest data rate to the highest commonly supported data rate sequentially.

In some implementations, each component in a link may advertise its ability to bypass equalization by setting one or more bits in one or more of the trainings sequences or other ordered sets sent by the device during link training. In some cases, the ordered set may be an ordered set (e.g., a PCIe TS1 or TS2 training set) sent within a particular link training state or substate (e.g., a configuration or polling state or substate). For instance, in one example, devices may advertise whether sequential equalization bypass is supported or not. As an example, FIG. 11 illustrates an example implementation of a PCIe TS1 training sequence 1100 modified to enable advertising of support for sequential equalization bypass. Other ordered sequences and modifications of existing, defined ordered sequences may be provided to communicate similar information in other implementations. Further, a training sequence (e.g., PCIe TS1 or TS2) sent by a device may be provided to identify the highest generation data rate supported by the corresponding device.

In the particular example of FIG. 11, a training sequence is modified to utilize a particular Reserved bit (e.g., Bit 6 of Symbol 5), for instance, in a Training Control Symbol 1105, may be designated to allow devices to indicate whether they support sequential equalization bypass. For instance, a transmitting endpoint device may encode the bit with 1b if it supports sequential equalization bypass and encode the bit with 0b if it does not. Downstream device, which receive the training sequence, may identify whether the bit is set or not. If the bit is not set to indicate the sequential equalization bypass, the receiving (or forwarding) device may leave the bit as 0b regardless of whether or not it supports sequential equalization bypass, as the presence of the 0b value in the designated bit indicates that at least one upstream component does not support the feature, making it unavailable for the link. Likewise, if a training sequence is received with the sequential equalization bypass bit set to 1b, if the receiving device does not support sequential equalization bypass, the receiving device may flip the bit to 0b and send along the training sequence to indicate that sequential equalization bypass may not be supported for this link. Similarly, retimers or other extension devices that are at least partially protocol aware, may receive such training sequences, identify the bit designated to flag sequential equalization bypass, and either allow a training sequence set to 1b to be forwarded along to an endpoint port (or additional retimer) if the retimer also supports sequential equalization bypass or to flip the bit to 0b if does not support this feature. In other examples, more than one equalization bypass bit may be provided, with each of the multiple equalization bypass bit corresponding to one of the of the devices on the link, such that each device can independently indicate, whether the device supports sequential equalization bypass or not. Accordingly, through such mechanisms, by the time the link trains to L0, all components of the link know (e.g., from modified training sequences received by or looped back to the device) whether the sequential equalization bypass will be supported for the link to cause the highest supported data rate to be entered directly from the Gen1 data rate, or whether equalization is to be performed incrementally in sequence (e.g., from Gen1 to Gen2 to Gen3, etc.).

As illustrated in the example of FIG. 10, if all of the devices on a link advertise that they are capable of supporting sequential equalization bypass, the devices, when training the link, may exit L0 to recovery by exchanging equalization ordered sets (e.g., equalization PCIe TS2s) to carry the preset information corresponding to the highest common data rate supported by each of the devices. The link enters the highest data rate in Recovery, performs equalization and then enters L0 at the highest data rate after which it enters the operational data transmission state (e.g., by completing an initialization flow control (Init_FC) handshake). If equalization at the highest data rate fails, the link state may return to L0 at the Gen1 data rate to allow the devices to return to Recovery and attempt to equalize at the data rate below the highest data rate, and so on, as illustrated, for instance, in the example of FIG. 10.

It should be noted that even though this feature is defined with Gen 5 data rate, components supporting lower data rates (e.g., Gen 4), can still take advantage of this feature by advertising Gen 5 data rate with 'Highest Data Rate Equalization only' during the initial link training to L0 in Gen 1 Data Rate and on entry to Recovery, not advertise Gen 5 data rate and wait for a while so that the other side can see its TS1'es so that the EQ TS2'es can reflect the presets for the maximum data rate (e.g., Gen 4).

In some implementations, dynamic data width modulation (e.g., as opposed to data rate) may be utilized at the highest Data Rate for saving power when the link utilization is substantially below 50%. Further, in the case of degrading or marginal links detected in a system (e.g., by a component device or supporting software), the link may be downsized to a degraded lane width (e.g., half width). For instance, a lane error status register and/or a lane margining feature may be utilized to operate a link at degraded width at the highest common data rate in response to identifying performance or power issues relating to the link. In some instances, a link may degrade such that an impermissibly large portion (e.g., a majority) of the lanes of an operational link are marginal at the equalized-to data rate. In some instances, where lane width adjustment are unable to save a link operating at a particular data rate (e.g., Gen(n)), the speed of the link may be downgraded. If the link was trained using sequential equalization bypass, equalization parameters for the lower generation data rates will not yet have been obtained for the link. Accordingly, downgrading the data rate of such a link may involve generating an interrupt event to allow the link to be retrained at the next lowest data rate (e.g., Gen(n−1)) and attempt to equalize the link at this lower data rate. Further, in some examples, the interrupt event quiesces the system (e.g., to prevent timeouts during the next equalization attempt), and runs equalization at the lower data rate prior to restoring the link. In some cases, this approach may degrade the performance in marginal links, given that additional equalization at the lower data rates is performed in response, but, in some cases, this may represent a reasonable trade-off compared to a long, initial link training time (as is the case in sequential equalization), among other example implementations and considerations.

As introduced above, in some implementations, a link, such as a PCIe-compliant link, can include one or more retimers or other extension devices, such as a repeater. A retimer device (or simply "retimer"), can include active electronic devices that receive and re-transmit (retime) digital I/O signals. Re-timers can be used to extend the length of a channel that can be used with a digital I/O bus. Retimers can be protocol aware, software transparent, and capable of executing a link equalization procedure, such as the link equalization procedure of PCIe. A link incorporating one or more retimers can form two or more separate electrical sub-links at data rates comparable to data rates realized by links employing similar protocols but with no retimers. For instance, a link including a single retimer can form a link with two separate sub-links, each operating at a speed, such as speeds of 8 GT/s, 16 GT/s, 25 GT/s, 32.0 GT/s, or higher.

Figures 12A, 12B:
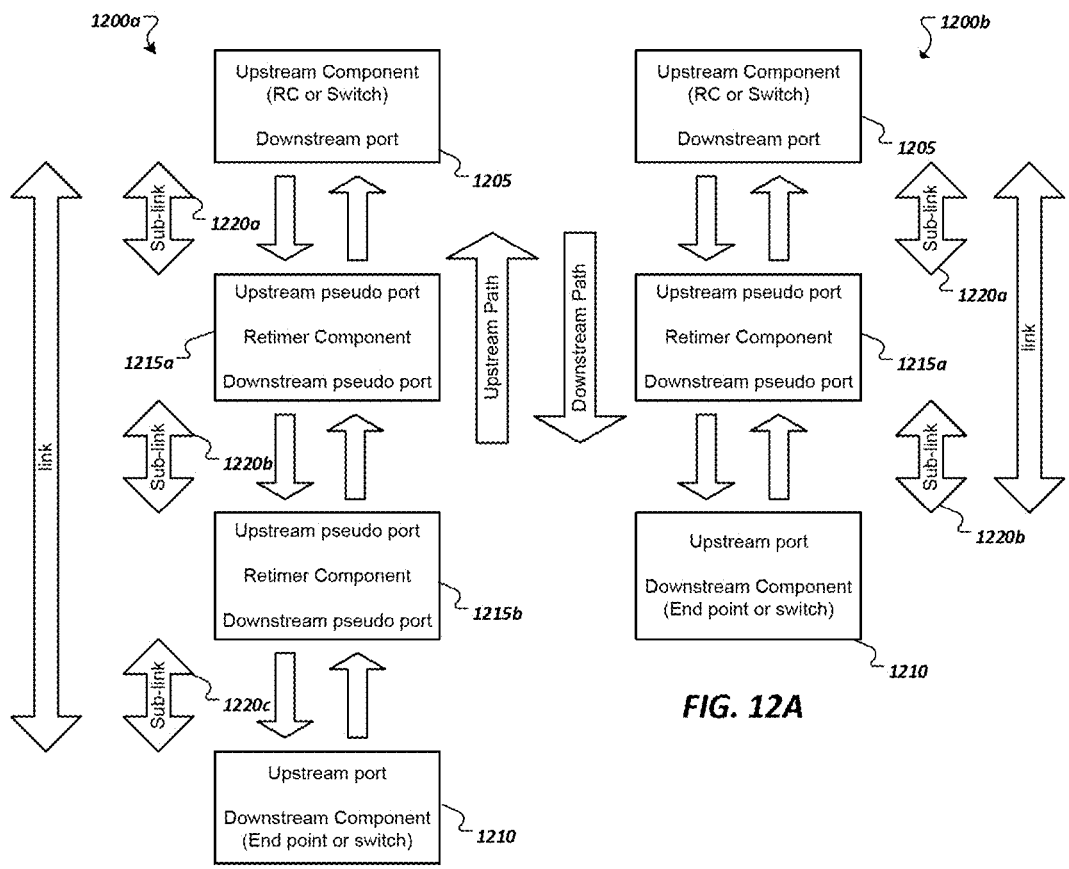
FIGS. 12A-12B illustrate simplified block diagrams of example links including one or more extension devices.

FIGS. 12A-12B illustrate simplified block diagrams 1200a-b of example links including one or more retimers. For instance, in FIG. 12A, a link connecting a first component 1205 (e.g., an upstream component) to a second component 1210 (e.g., a downstream component) can include a single retimer 1215a. A first sublink 1220a can connect the first component 1205 to the retimer 1215a and a second sublink 1220b can connect the retimer 1215a to the second component. As shown in FIG. 12B, multiple retimers 1215a, 1215b can be utilized to extend a link. Three sublinks 1220a-c can be defined through the two retimers 1215a, 1215b, with a first sublink 1215a connecting the first component to the first retimer 1215a, a second sublink connecting the first retimer 1215a to the second retimer 1215b, and the third sublink 1215c connecting the second retimer 1215b to the second component.

As shown in the examples of FIGS. 12A-12B, a retimer can include two pseudo ports, and the pseudo ports can determine their respective downstream/upstream orientation dynamically. Each retimer 1215a, 1215b can have an upstream path and a downstream path. Further, retimers 1215a, 1215b can support operating modes including a forwarding mode and an executing mode. A retimer 1215a, 1215b in some instances can decode data received on the sublink and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

In some implementations, an interconnect may be defined to support a maximum number of extension devices, such as retimers. For instance, an earlier generation of the interconnect may support a first number of extension devices (e.g., 1 or 2 retimers on a link connecting two end devices), while a later generation of the interconnect (e.g., the high performance interconnect discussed above) may support a larger number of extension device (e.g., 4 or more retimers). To preserve backward compatibility, the later generation of the interconnect may natively support the protocols and training adapted for links where a first number of retimers (or redrivers) are on the link, but may also provide logic for end devices, which support the newer generation of the interconnect, to handle the larger permitted number of retimers. Additionally, a retimer may be equipped with protocol logic to support multiple alternate protocols and a sequential equalization bypass mode, among other example functionality.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
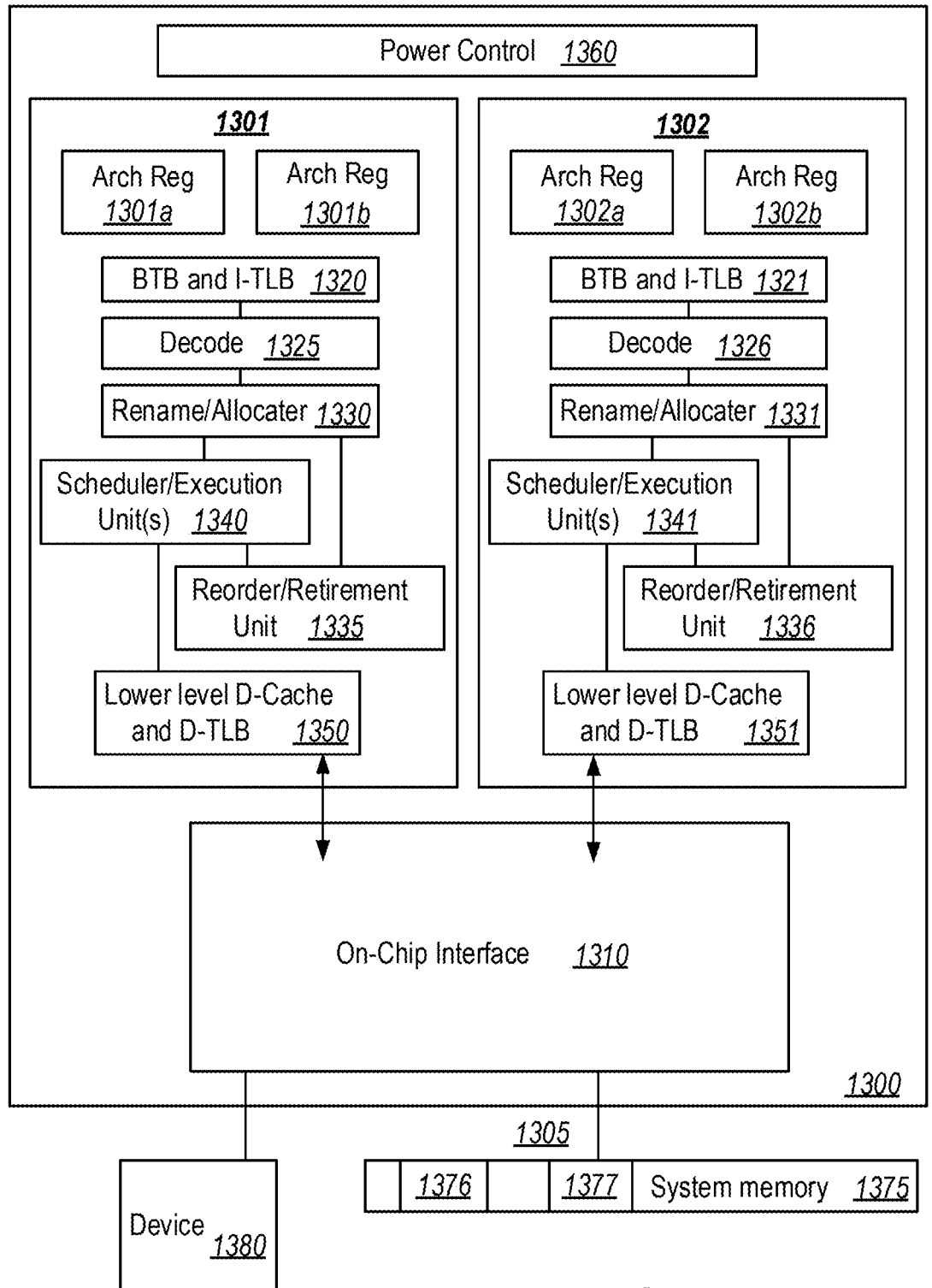
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301*a*, a second thread is associated with architecture state registers 1301*b*, a third thread may be associated with architecture state registers 1302*a*, and a fourth thread may be associated with architecture state registers 1302*b*. Here, each of the architecture state registers (1301*a*, 1301*b*, 1302*a*, and 1302*b*) may be referred to as processing elements, thread slots, or thread units, as described above. As illustrated, architecture state registers 1301*a* are replicated in architecture state registers 1301*b*, so individual architecture states/contexts are capable of being stored for logical processor 1301*a* and logical processor 1301*b*. In core 1301, other smaller resources, such as instruction pointers and renaming logic in allocator and renamer block 1330 may also be replicated for threads 1301*a* and 1301*b*. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301*a*, 1301*b*, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301*a* and 1301*b* are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
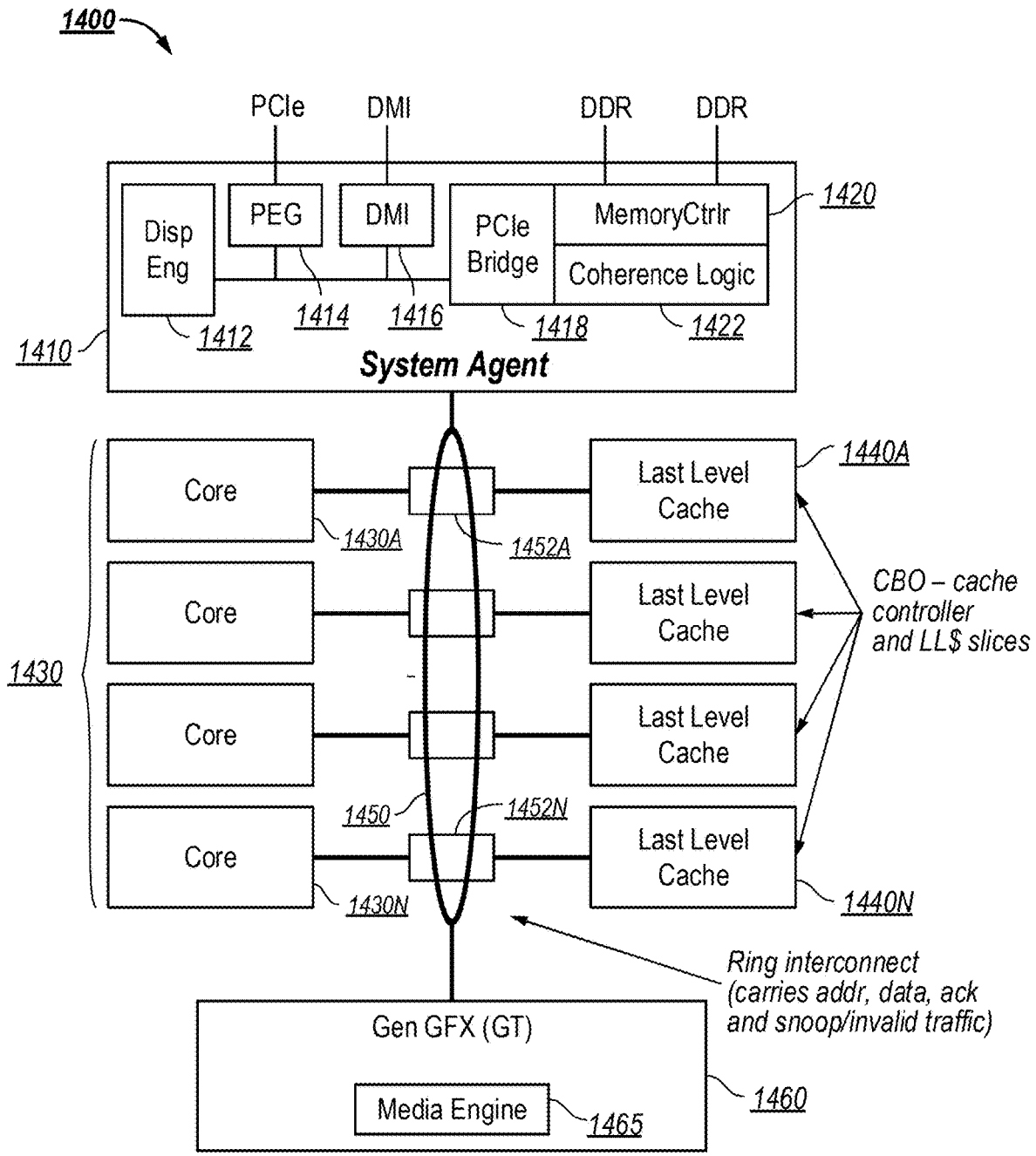
FIG. 14 illustrates another embodiment of a block diagram for a computing system including a multicore processor.

Referring now to FIG. 14, shown is a block diagram of an embodiment of a multicore processor. As shown in the embodiment of FIG. 14, processor 1400 includes multiple domains. Specifically, a core domain 1430 includes a plurality of cores 1430A-1430N, a graphics domain 1460 includes one or more graphics engines having a media engine 1465, and a system agent domain 1410.

In various embodiments, system agent domain 1410 handles power control events and power management, such that individual units of domains 1430 and 1460 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1430 and 1460 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1430 further includes low level caches in addition to various execution units and additional processing elements. Here, the various cores are coupled to each other and to a shared cache memory that is formed of a plurality of units or slices of a last level cache (LLC) 1440A-1440N; these LLCs often include storage and cache controller functionality and are shared amongst the cores, as well as potentially among the graphics engine too.

As seen, a ring interconnect 1450 couples the cores together, and provides interconnection between the core domain 1430, graphics domain 1460 and system agent circuitry 1410, via a plurality of ring stops 1452A-1452N, each at a coupling between a core and LLC slice. As seen in FIG. 14, interconnect 1450 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1410 includes display engine 1412 which is to provide control of and an interface to an associated display. System agent domain 1410 may include other units, such as: an integrated memory controller 1420 that provides for an interface to a system memory (e.g., a DRAM implemented with multiple DIMMs; coherence logic 1422 to perform memory coherence operations. Multiple interfaces may be present to enable interconnection between the processor and other circuitry. For example, in one embodiment at least one direct media interface (DMI) 1416 interface is provided as well as one or more PCIe™ interfaces 1414. The display engine and these interfaces typically couple to memory via a PCIe™ bridge 1418. Still further, to provide for communications between other agents, such as additional processors or other circuitry, one or more other interfaces may be provided.

Figure 15:
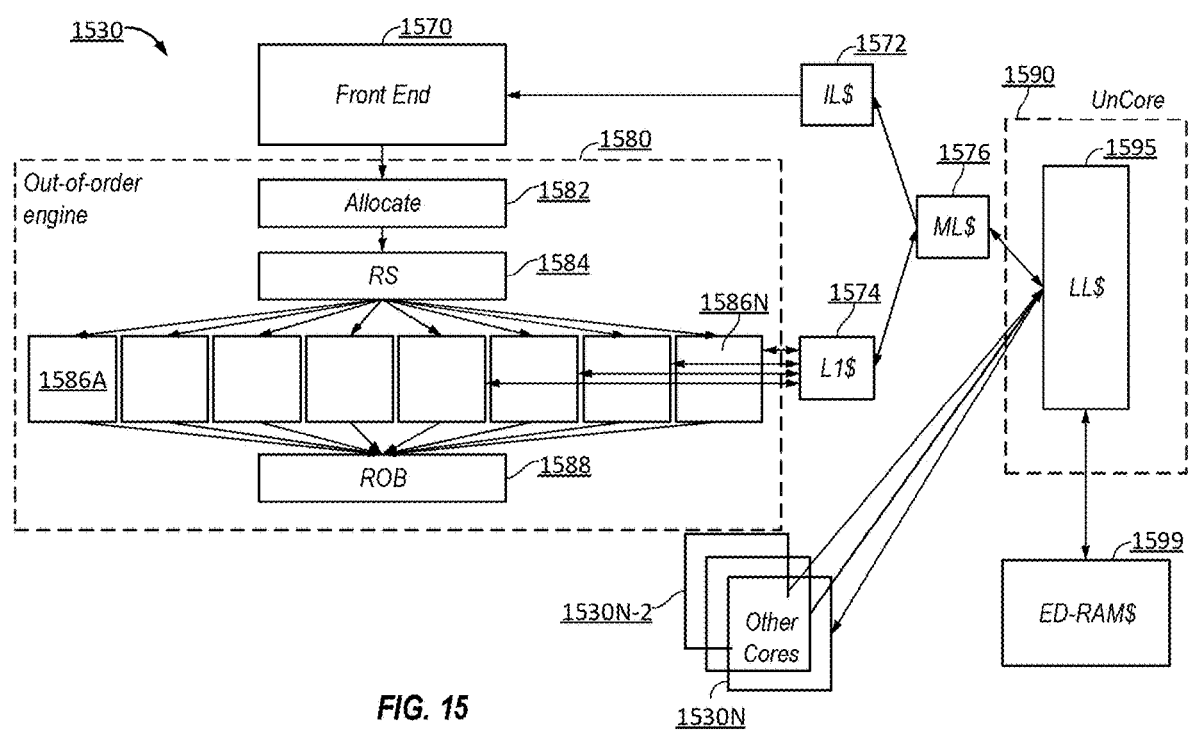
FIG. 15 illustrates an embodiment of a block diagram for a processor.

Referring now to FIG. 15, shown is a block diagram of a representative core; specifically, logical blocks of a back-end of a core, such as core 1430 from FIG. 14. In general, the structure shown in FIG. 15 includes an out-of-order processor that has a front end unit 1570 used to fetch incoming instructions, perform various processing (e.g. caching, decoding, branch predicting, etc.) and passing instructions/operations along to an out-of-order (OOO) engine 1580. OOO engine 1580 performs further processing on decoded instructions.

Specifically in the embodiment of FIG. 15, out-of-order engine 1580 includes an allocate unit 1582 to receive decoded instructions, which may be in the form of one or more micro-instructions or uops, from front end unit 1570, and allocate them to appropriate resources such as registers and so forth. Next, the instructions are provided to a reservation station 1584, which reserves resources and schedules them for execution on one of a plurality of execution units 1586A-1486N. Various types of execution units may be present, including, for example, arithmetic logic units (ALUs), load and store units, vector processing units (VPUs), floating point execution units, among others. Results from these different execution units are provided to a reorder buffer (ROB) 1588, which take unordered results and return them to correct program order.

Still referring to FIG. 15, note that both front end unit 1570 and out-of-order engine 1580 are coupled to different levels of a memory hierarchy. Specifically shown is an instruction level cache 1572, that in turn couples to a mid-level cache 1576, that in turn couples to a last level cache 1595. In one embodiment, last level cache 1595 is implemented in an on-chip (sometimes referred to as uncore) unit 1590. As an example, unit 1590 is similar to system agent 1310 of FIG. 13. As discussed above, uncore 1590 communicates with system memory 1599, which, in the illustrated embodiment, is implemented via ED RAM. Note also that the various execution units 1586 within out-of-order engine 1580 are in communication with a first level cache 1574 that also is in communication with mid-level cache 1576. Note also that additional cores 1530N-2-1530N can couple to LLC 1595. Although shown at this high level in the embodiment of FIG. 15, understand that various alterations and additional components may be present.

Figure 16:
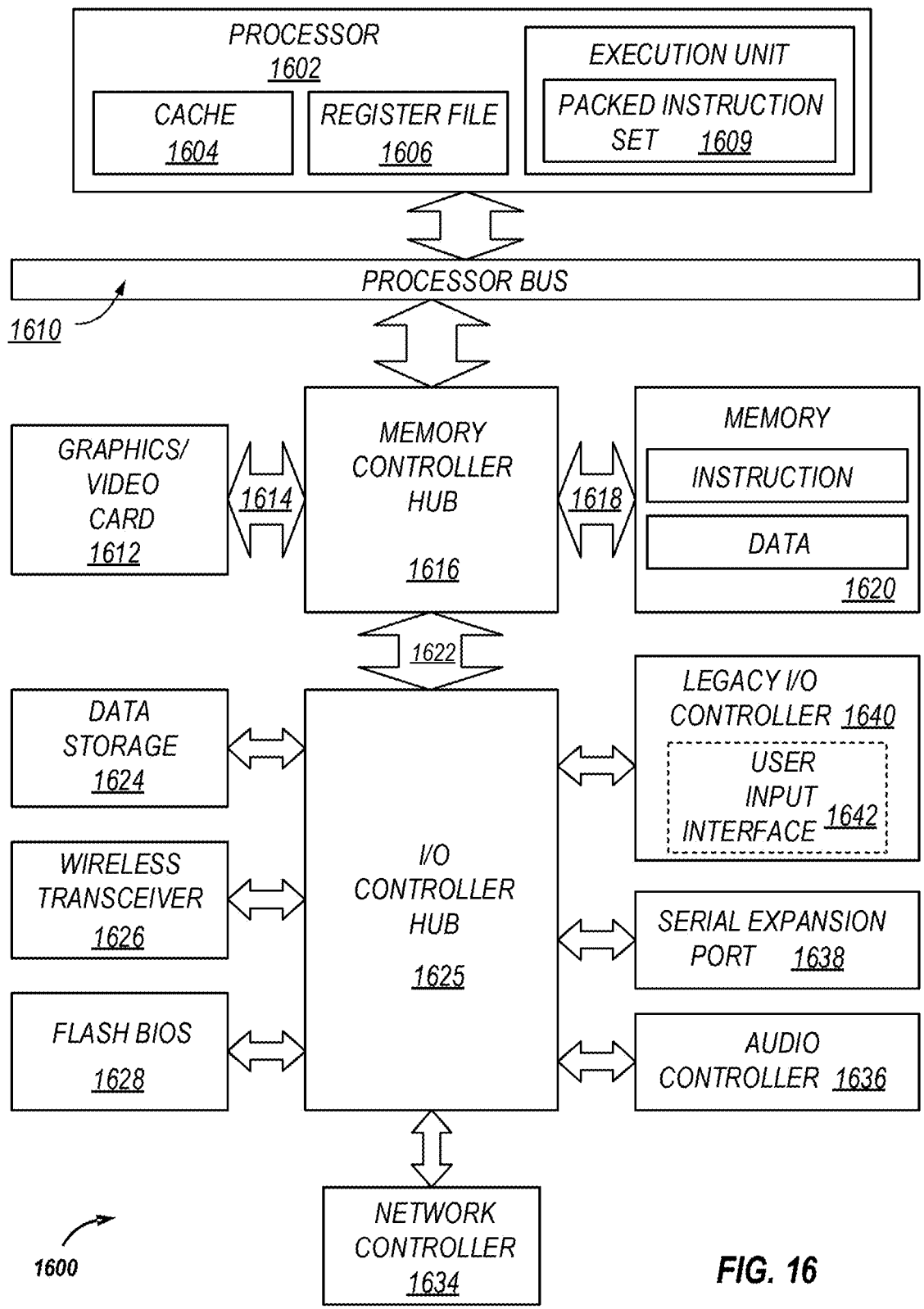
FIG. 16 illustrates another embodiment of a block diagram for a computing system including a processor.

Turning to FIG. 16, a block diagram of an exemplary computer system formed with a processor that includes execution units to execute an instruction, where one or more of the interconnects implement one or more features in accordance with one embodiment of the present invention is illustrated. System 1600 includes a component, such as a processor 1602 to employ execution units including logic to perform algorithms for process data, in accordance with the present invention, such as in the embodiment described herein. System 1600 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1600 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1602 includes one or more execution units 1608 to implement an algorithm that is to perform at least one instruction. One embodiment may be described in the context of a single processor desktop or server system, but alternative embodiments may be included in a multiprocessor system. System 1600 is an example of a 'hub' system architecture. The computer system 1600 includes a processor 1602 to process data signals. The processor 1602, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1602 is coupled to a processor bus 1610 that transmits data signals between the processor 1602 and other components in the system 1600. The elements of system 1600 (e.g. graphics accelerator 1612, memory controller hub 1616, memory 1620, I/O controller hub 1625, wireless transceiver 1626, Flash BIOS 1628, Network controller 1634, Audio controller 1636, Serial expansion port 1638, I/O controller 1640, etc.) perform their conventional functions that are well known to those familiar with the art.

In one embodiment, the processor 1602 includes a Level 1 (L1) internal cache memory 1604. Depending on the architecture, the processor 1602 may have a single internal cache or multiple levels of internal caches. Other embodiments include a combination of both internal and external caches depending on the particular implementation and needs. Register file 1606 is to store different types of data in various registers including integer registers, floating point registers, vector registers, banked registers, shadow registers, checkpoint registers, status registers, and instruction pointer register.

Execution unit 1608, including logic to perform integer and floating point operations, also resides in the processor 1602. The processor 1602, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1602. For one embodiment, execution unit 1608 includes logic to handle a packed instruction set 1609. By including the packed instruction set 1609 in the instruction set of a general-purpose processor 1602, along with associated circuitry to execute the instructions, the operations used by many multimedia applications may be performed using packed data in a general-purpose processor 1602. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1608 may also be used in micro controllers, embedded processors, graphics devices, DSPs, and other types of logic circuits. System 1600 includes a memory 1620. Memory 1620 includes a dynamic random access memory (DRAM) device, a static random access memory (SRAM) device, flash memory device, or other memory device. Memory 1620 stores instructions and/or data represented by data signals that are to be executed by the processor 1602.

Note that any of the aforementioned features or aspects of the invention may be utilized on one or more interconnect illustrated in FIG. 16. For example, an on-die interconnect (ODI), which is not shown, for coupling internal units of processor 1602 implements one or more aspects of the invention described above. Or the invention is associated with a processor bus 1610 (e.g. other known high performance computing interconnect), a high bandwidth memory path 1618 to memory 1620, a point-to-point link to graphics accelerator 1612 (e.g. a Peripheral Component Interconnect express (PCIe) compliant fabric), a controller hub interconnect 1622, an I/O or other interconnect (e.g. USB, PCI, PCIe) for coupling the other illustrated components. Some examples of such components include the audio controller 1636, firmware hub (flash BIOS) 1628, wireless transceiver 1626, data storage 1624, legacy I/O controller 1610 containing user input and keyboard interfaces 1642, a serial expansion port 1638 such as Universal Serial Bus (USB), and a network controller 1634. The data storage device 1624 can comprise a hard disk drive, a floppy disk drive, a CD-ROM device, a flash memory device, or other mass storage device.

Figure 17:
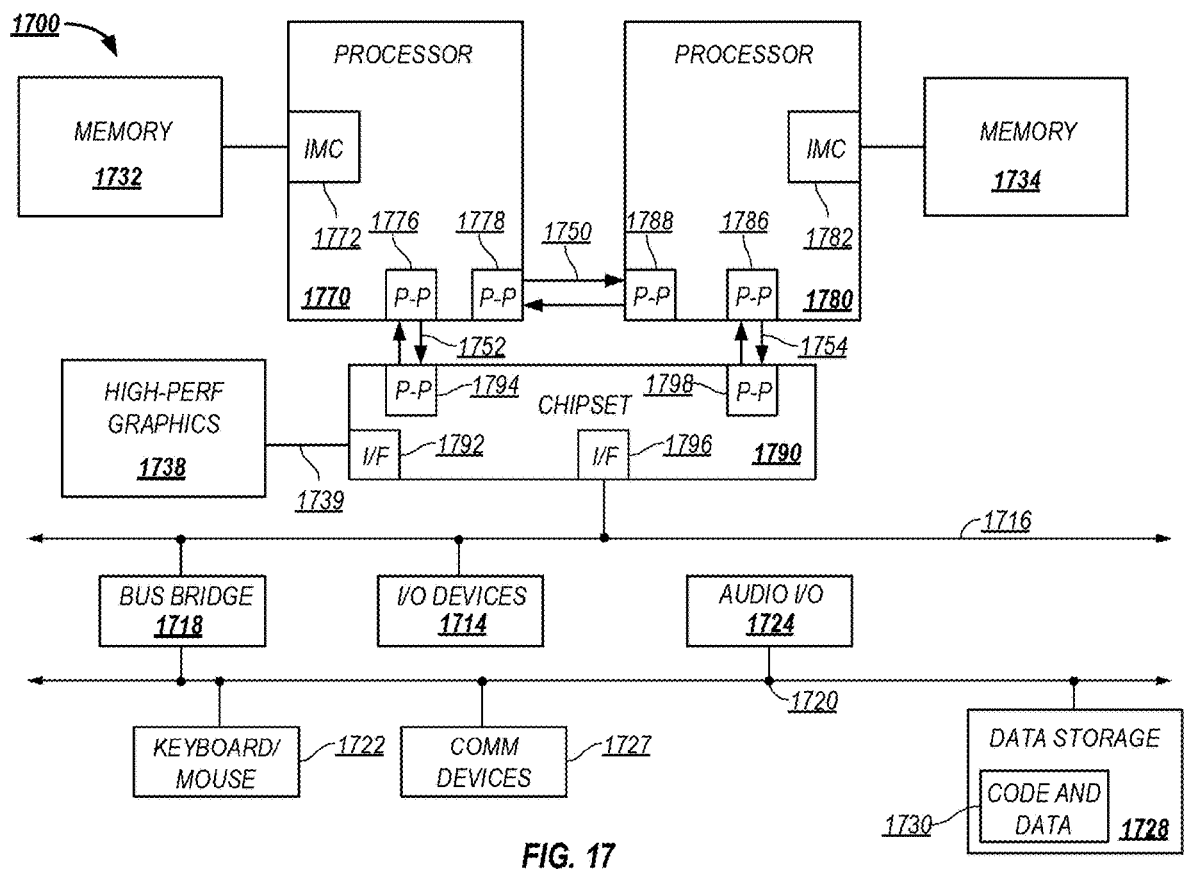
FIG. 17 illustrates an embodiment of a block for a computing system including multiple processors.

Referring now to FIG. 17, shown is a block diagram of a second system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of a processor. In one embodiment, 1752 and 1754 are part of a serial, point-to-point coherent interconnect fabric, such as a high-performance architecture. As a result, the invention may be implemented within the QPI architecture.

While shown with only two processors 1770, 1780, it is to be understood that the scope of the present invention is not so limited. In other embodiments, one or more additional processors may be present in a given processor.

Processors 1770 and 1780 are shown including integrated memory controller units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 each exchange information with a chipset 1790 via individual P-P interfaces 1752, 1754 using point to point interface circuits 1776, 1794, 1786, 1798. Chipset 1790 also exchanges information with a high-performance graphics circuit 1738 via an interface circuit 1792 along a high-performance graphics interconnect 1739.

A shared cache (not shown) may be included in either processor or outside of both processors; yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 are coupled to first bus 1716, along with a bus bridge 1718 which couples first bus 1716 to a second bus 1720. In one embodiment, second bus 1720 includes a low pin count (LPC) bus. Various devices are coupled to second bus 1720 including, for example, a keyboard and/or mouse 1722, communication devices 1727 and a storage unit 1728 such as a disk drive or other mass storage device which often includes instructions/code and data 1730, in one embodiment. Further, an audio I/O 1724 is shown coupled to second bus 1720. Note that other architectures are possible, where the included components and interconnect architectures vary. For example, instead of the point-to-point architecture of FIG. 17, a system may implement a multi-drop bus or other such architecture.

Figure 18:
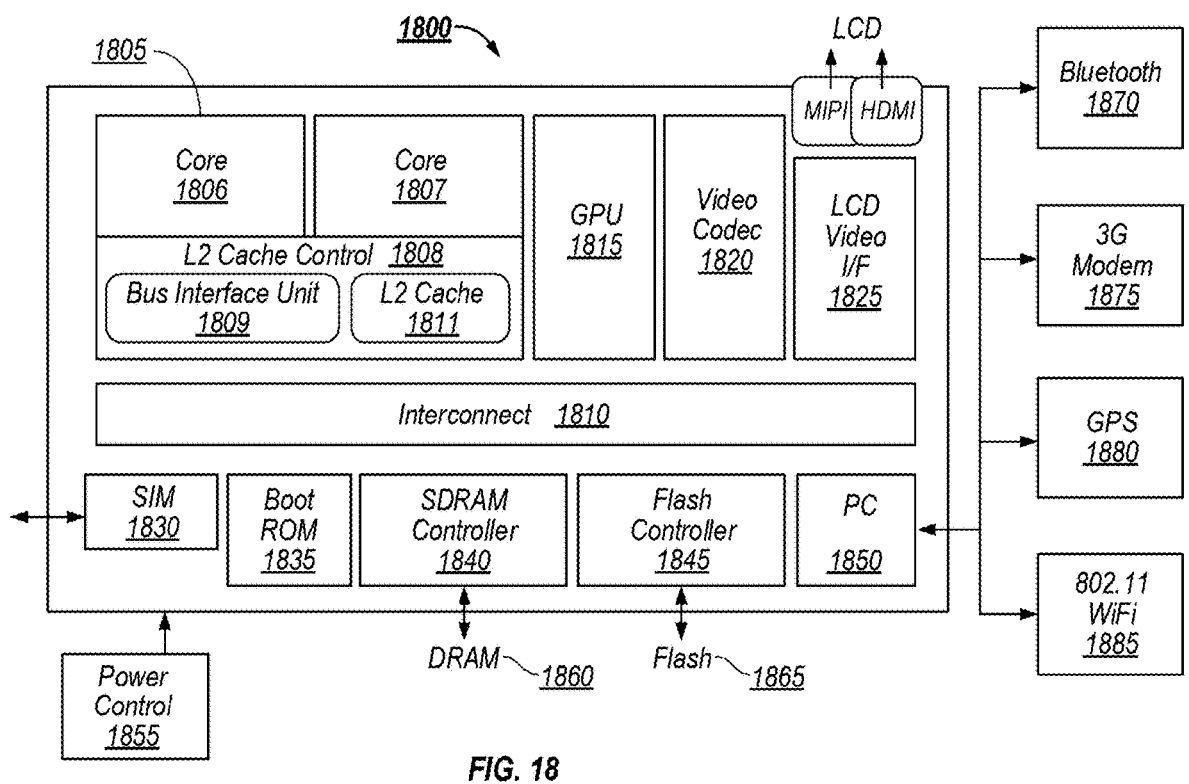
FIG. 18 illustrates an example system implemented as system on chip (SoC).

Turning next to FIG. 18, an embodiment of a system on-chip (SOC) design in accordance with the inventions is depicted. As a specific illustrative example, SOC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1800 includes 2 cores—1806 and 1807. Similar to the discussion above, cores 1806 and 1807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1811 to communicate with other parts of system 1800. Interconnect 1810 includes an on-chip interconnect, such as an IOSF, AMBA, or other interconnect discussed above, which potentially implements one or more aspects of described herein.

Interface 1810 provides communication channels to the other components, such as a Subscriber Identity Module (SIM) 1830 to interface with a SIM card, a boot ROM 1835 to hold boot code for execution by cores 1806 and 1807 to initialize and boot SOC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the invention described herein.

In addition, the system illustrates peripherals for communication, such as a Bluetooth module 1870, 3G modem 1875, GPS 1885, and WiFi 1885. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1 's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, an electronic device may be configured to perform one or more processes, techniques, and/or methods as described herein, or portions thereof. One such process is depicted in Figure X-2. For example, the process may include performing, by a first and second retimer, an SKP adjustment during a first SKP ordered set (OS); and performing, by a third and fourth retimer, an SKP adjustment during a second SKP OS.

In some embodiments, an electronic device may be configured to perform one or more processes, techniques, and/or methods as described herein, or portions thereof. For example, the process may include enhancing a training ordered set (OS) to allow for five generations of speeds; and setting a configuration register to indicate a Gen 5 PCIe speed.

In some embodiments, an electronic device may be configured to perform one or more processes, techniques, and/or methods as described herein, or portions thereof. For example, the process may include identifying a channel type provided by a platform; identifying a presence of one or more retimers; and choosing, based on the channel type and whether one or more retimers are present, between 25 Gigatransfers per second (GT/s) and 32 GT/s.

In some embodiments, an electronic device may be configured to perform one or more processes, techniques, and/or methods as described herein, or portions thereof. For example, the process may include identifying a channel link width from a set that includes widths of ×20, ×24, ×28, and ×28; and communicating over a channel link based on the identified channel link width.

In some embodiments, an electronic device may be configured to perform one or more processes, techniques, and/or methods as described herein, or portions thereof. For example, the process may include identifying recovered clock data from clock data recovery (CDR); and transmitting, based on the recovered clock data, transmit (TX) data after an initial training.

In some embodiments, a method of communicating in accordance with a PCIe standard may be provided that includes performing, by a first and second retimer, an SKP adjustment during a first SKP ordered set (OS), and performing, by a third and fourth retimer, an SKP adjustment during a second SKP OS. The method can further include reducing a SKP OS frequency by half. In some cases, the first SKP OS may be sent back-to-back with the second SKP OS. The method may further include enhancing a training ordered set (OS) to allow for five generations of speeds, and setting a configuration register to indicate a Gen 5 PCIe speed. Further, a channel type provided by a platform may be identified, the presence of one or more retimers may be identified, and the channel speed may be selected (e.g., from either 25 Gigatransfers per second (GT/s) or 32 GT/s) based on the channel type and whether one or more retimers are present. This selection may also be determined based on whether forward error correction (FEC) is enabled or supported. This speed selection may take place during link training. These example methods may additional include identifying a channel link width from a set that includes widths of ×20, ×24, ×28, and ×28, and communicating over a channel link based on the identified channel link width. Further, recovered clock data from a clock data recovery component may be identified, and transmit data may be sent based on the recovered clock data following training of the link.

In some embodiments, an apparatus may be provided to communicate in accordance with a PCIe-based standard, the apparatus including an extended continuous time linear equalizer (CTLE), and/or minimum 8-tap decision feedback equalizer (DFE), and/or a T-coil or Pi-coil termination, and/or a data pattern filter related to clock data recovery (CDR), and/or a 4-way interleaved clock architecture, among other example features and components.

In some embodiments, an apparatus may be provided to communicate in accordance with a peripheral component interconnect express (PCIe) standard with channel loss characteristics, such as discussed above. The PCIe standard may be a Gen 5 (or higher) PCIe standard.

The following examples pertain to embodiments in accordance with this Specification. Example 1 is an apparatus including a port to connect to another device over a link. The port includes equalization logic to perform equalization of the link at a plurality of different data rates. The equalization logic is further to determine a maximum supported data rate in the plurality of data rates, and participate in equalization of the link at the maximum supported data rate before equalizing the link at one or more other data rates lower than the maximum supported data rate in the plurality of data rates.

Example 2 may include the subject matter of example 1, where the equalization logic is to attempt to equalize the link at one of the other data rates lower than the maximum supported data rate after attempting to equalize the link at the maximum supported data rate.

Example 3 may include the subject matter of example 2, further including marginal lane detection logic to determine errors in operation of the link at the maximum supported data rate, where the equalization logic attempts to equalize the link at the other lower data rate based on the errors in the operation of the link at the maximum supported data rate.

Example 4 may include the subject matter of any one of examples 2-3, where the equalization logic is further to determine that equalization of the link at the maximum supported data rate is unsuccessful, and the equalization logic attempts to equalize the link at the other lower data rate based on unsuccessful equalization of the link at the maximum supported data rate.

Example 5 may include the subject matter of any one of examples 1-4, where the port further includes protocol stack logic to enter an active link state at a lowest of the plurality of data rates prior to participate in equalization of the link at the maximum supported data rate.

Example 6 may include the subject matter of example 5, where determining the maximum supported data rate includes identifying a highest data rate supported by the other device from one or more ordered sequences used to train the link, and the maximum supported data rate includes a highest data rate in the plurality of data rates supported by the apparatus and the other device.

Example 7 may include the subject matter of any one of examples 5-6, where the protocol stack logic is to enter a recovery state to participate in the equalization procedure.

Example 8 may include the subject matter of any one of examples 1-7, where the maximum supported data rate includes a data rate slower than the highest data rate in the plurality of data rates.

Example 9 may include the subject matter of any one of examples 1-8, where the plurality of data rates correspond to a plurality of generations of a particular interconnect protocol.

Example 10 may include the subject matter of example 9, where the particular interconnect protocol includes a Peripheral Interconnect Express (PCIe)-based protocol.

Example 11 may include the subject matter of any one of examples 1-10, where the equalization logic is to perform equalization of the link according to any one of a plurality of equalization modes, a first equalization mode is to perform equalization of each of the plurality of data rates in sequence from slowest to fastest, and a second equalization mode includes equalizing the link first at the maximum supported data rate before equalizing the link at one or more other data rates in the plurality of data rates lower than the maximum supported data rate.

Example 12 may include the subject matter of example 11, where the equalization logic is further to identify that the other device supports the second equalization mode, and performing equalization according to the second equalization mode is based at least in part on identifying that both the apparatus and the other device support the second equalization mode.

Example 13 may include the subject matter of example 12, where the port is to receive one or more ordered sets to identify one or more bits set to indicate that the other device supports the second equalization mode.

Example 14 may include the subject matter of any one of examples 12-13, where the first equalization mode includes a default equalization mode and is to be used when at least one device on the link fails to support the second equalization mode.

Example 15 may include the subject matter of any one of examples 1-14, where the plurality of data rates includes at least four defined data rates corresponding to at least four generations of an interconnect protocol.

Example 16 may include the subject matter of example 15, where the highest of the at least four defined data rates includes at least 32 G/Ts.

Example 17 is a method including: training a link to enter an active state, where the link connects at least a first device and a second device, and the active state is entered at a lowest one of a plurality of data rates defined for an interconnect protocol; determining that a particular one of the plurality of data rates is the highest data rate supported by both the first and second devices; determining that each of the first and second devices support a particular link equalization mode, where each of the first and second devices natively support a default link equalization mode, the default link equalization mode is to perform equalization of each of the plurality of data rates up to the particular data rate in sequence from slowest to fastest, and the particular link equalization mode includes equalizing the link first at the particular data rate before equalizing the link at one or more other data rates in the plurality of data rates lower than the particular data rate; and performing equalization of the link according to the particular link equalization mode.

Example 18 may include the subject matter of example 17, where determining that each of the first and second device supports the particular link equalization mode includes receiving an ordered set including one or more bits set to indicate that the second device supports the particular link equalization mode.

Example 19 may include the subject matter of example 17, where performing equalization of the link according to the particular link equalization mode includes: attempting to equalize the link at the particular data rate; and subsequently attempting to equalize the link at a data rate lower than the particular data rate.

Example 20 may include the subject matter of example 19, further including determining errors in operation of the link at the particular data rate, where the link is equalized at the other lower data rate based on the errors in the operation of the link at the particular data rate.

Example 21 may include the subject matter of any one of examples 19-20, further including determining that the attempt to equalize the link at the particular data rate is unsuccessful, where the link is equalized at the other lower data rate based on unsuccessful equalization of the link at the particular data rate.

Example 22 may include the subject matter of any one of examples 17-21, where the particular data rate is determined from one or more training sequences communicated by the first and second devices.

Example 23 may include the subject matter of any one of examples 17-22, further including entering a recovery state prior to performing the equalization.

Example 24 may include the subject matter of any one of examples 17-23, where the particular data rate includes a data rate slower than the highest data rate in the plurality of data rates.

Example 25 may include the subject matter of any one of examples 17-24, where the plurality of data rates correspond to a plurality of generations of a particular interconnect protocol.

Example 26 may include the subject matter of example 25, where the particular interconnect protocol includes a Peripheral Interconnect Express (PCIe)-based protocol.

Example 27 may include the subject matter of any one of examples 17-26, where the plurality of data rates includes at least four defined data rates corresponding to at least four generations of an interconnect protocol.

Example 28 may include the subject matter of example 27, where the highest of the at least four defined data rates includes at least 32 G/Ts.

Example 29 is a system including means to perform the method of any one of examples 17-28.

Example 30 may include the subject matter of example 29, where the means include a computer readable storage medium storing instructions executable by a machine to perform at least a portion of the method of any one of examples 17-28.

Example 31 may include the subject matter of any one of examples 29-30, where the means include circuitry to perform at least a portion of the method of any one of examples 17-28.

Example 32 is a system including a first device and a second device. The second device includes a port to connect to the first device over a link, where the port includes equalization logic to perform equalization of the link at a plurality of different data rates. The equalization logic is further to: determine that a particular one of the plurality of data rates is the highest data rate supported by both the first device and the second device; and attempt to equalize the link at the particular data rate before equalizing the link at one or more other data rates in the plurality of data rates lower than the particular data rate.

Example 33 may include the subject matter of example 32, where the equalization logic is further to receive an ordered set from the first device including one or more bits identifying that the first device supports a particular equalization mode, each of the first and second device support a default equalization mode, the default equalization mode is to perform equalization of each of the plurality of data rates up to the particular data rate in sequence from slowest to fastest, and the particular equalization mode includes equalizing the link first at the particular data rate before equalizing the link at one or more other data rates in the plurality of data rates lower than the particular data rate.

Example 34 may include the subject matter of example 33, further including a retimer to extend physical length of the link, where the retimer is connected between the first and second devices on the link and includes equalization logic to: indicate, to at least one of the first and second devices, a highest one of the plurality of data rates supported by the retimer; and indicate, to at least one of the first and second devices, that the retimer supports the particular equalization mode.

Example 35 may include the subject matter of any one of examples 33-34, where the particular equalization mode is used only if each device on the link identifies that it supports the particular equalization mode.

Example 36 may include the subject matter of any one of examples 32-35, where the second device further includes marginal lane detection logic to determine errors in the operation of the link at the particular data rate, where the equalization logic is to attempt to equalize the link at a data rate immediately below the particular data rate based on the errors.

Example 37 may include the subject matter of example 36, further including system software to quiesce the link prior to equalizing the link at the data rate immediately below the particular data rate.

Example 38 may include the subject matter of any one of examples 32-37, where the equalization logic is further to determine that equalization of the link at the particular data rate is unsuccessful, and the equalization logic is to attempt to equalize the link at a data rate immediately below the particular data rate based on the unsuccessful equalization of the link at the particular data rate.

Example 39 may include the subject matter of any one of examples 32-38, where the equalization logic is to attempt to equalize the link at one of the other data rates lower than the particular data rate after attempting to equalize the link at the particular data rate.

Example 40 may include the subject matter of example 39, where the equalization logic is further to determine that equalization of the link at the particular data rate is unsuccessful, and the equalization logic attempts to equalize the link at the other lower data rate based on unsuccessful equalization of the link at the particular data rate.

Example 41 may include the subject matter of any one of examples 32-40, where the port further includes protocol stack logic to enter an active link state at a lowest of the plurality of data rates prior to participate in equalization of the link at the particular data rate.

Example 42 may include the subject matter of example 41, where determining the maximum supported data rate includes identifying a highest data rate supported by the other device from one or more ordered sequences used to train the link, and the maximum supported data rate includes a highest data rate in the plurality of data rates supported by the apparatus and the other device.

Example 43 may include the subject matter of any one of examples 41-42, where the protocol stack logic is to enter a recovery state to participate in the equalization procedure.

Example 44 may include the subject matter of any one of examples 32-43, where the particular data rate includes a data rate slower than the highest data rate in the plurality of data rates.

Example 45 may include the subject matter of any one of examples 32-44, where the plurality of data rates correspond to a plurality of generations of a particular interconnect protocol.

Example 46 may include the subject matter of example 45, where the particular interconnect protocol includes a Peripheral Interconnect Express (PCIe)-based protocol.

Example 47 may include the subject matter of any one of examples 32-46, where the plurality of data rates includes at least four defined data rates corresponding to at least four generations of an interconnect protocol.

Example 48 may include the subject matter of example 47, where the highest of the at least four defined data rates includes at least 32 G/Ts.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
 a port to couple to a link, wherein the link couples the port to a device, and the port comprises:
  physical layer circuitry to support two or more modes, wherein the two or more modes correspond to two or more different interconnect protocols;
  protocol circuitry to support each of the two or more interconnect protocols, wherein the protocol circuitry is to:
   receive a first training sequence during training of the link, wherein the first training sequence comprises a first field to identify a highest supported speed of the device and a second field to identify that the device supports equalization bypass;
   send a second training sequence to the device during the training of the link, wherein the second training sequence comprises a third field to identify a highest supported speed of the port and a fourth field to identify that the port also supports the equalization bypass; and equalization circuitry to perform equalization of the link according to the equalization bypass, wherein equalization according to the equalization bypass skips equalization for another lower speed supported by both the device and the port in favor of equalization at a higher speed supported by both the device and the port, wherein the higher speed is determined based on the respective highest supported speeds advertised in the first and second training sequences.

2. The apparatus of claim 1, wherein each of the highest supported speed of the port and the highest supported speed of the device comprise a respective one of a plurality of speeds defined in a protocol for the link.

3. The apparatus of claim 2, wherein the plurality of speeds comprises 2.5 gigatransfers (GT) per second (GT/s), 5.0 GT/s, 8.0 GT/s, 16.0 GT/s, and 32.0 GT/s.

4. The apparatus of claim 2, wherein the protocol circuitry is to train the link to a lowest one of the plurality of speeds prior to performing equalization of the link at the higher speed in accordance with the equalization bypass.

5. The apparatus of claim 1, wherein the protocol circuitry is to enter a recovery state to participate in the equalization of the link at the higher speed.

6. The apparatus of claim 1, wherein the equalization is performed according to a Peripheral Component Interconnect Express (PCIe)-based protocol.

7. The apparatus of claim 1, further comprising accelerator hardware, wherein the device comprises a host device.

8. The apparatus of claim 1, wherein the physical layer circuitry supports a physical layer comprising a PCIe-based electrical physical layer.

9. The apparatus of claim 1, wherein the two or more interconnect protocols comprise a Peripheral Component Interconnect Express (PCIe)-based protocol and a particular protocol comprising coherency, memory, and input/output (I/O) subprotocols.

10. The apparatus of claim 9, further comprising multiplexer circuitry to multiplex data of the coherency, memory, and I/O subprotocols.

11. The apparatus of claim 1, wherein each of the first and second training sequences is based on a PCIe TS1 training sequence or a PCIe TS2 training sequence.

12. An apparatus comprising:
a port to couple to a link, wherein the link couples a host device to an endpoint device, and the port comprises:
physical layer circuitry to implement a common physical layer comprising a Peripheral Component Interconnect Express-based electrical sub-block; and
protocol circuitry to support a plurality of different protocols, the common physical layer is to be used to send data according to the plurality of different protocols, and the protocol circuitry is to:
enter a particular link training state during training of the link;
send a first training sequence to the endpoint device in the particular link training state, wherein the first training sequence comprises a first field to identify a highest one of a plurality of defined data rates for the link supported by the port and further comprises a second field to identify that the port supports an equalization bypass mode;
receive a second training sequence in the particular link training state from the endpoint device, wherein the second training sequence comprises a third field to identify a highest one of the plurality of defined data rates supported by the endpoint device and further comprises a fourth field to identify that the endpoint device also supports the equalization bypass mode; and
determine that a particular one of the plurality of defined data rates comprises a highest rate supported by both the port and the endpoint device; and equalization circuitry to perform equalization of the link in the equalization bypass mode based on support of the equalization bypass mode by both the port and the endpoint device, wherein equalization at data rates in the plurality of data rates below the particular data rate are to be skipped in the equalization bypass mode.

13. The apparatus of claim 12, wherein equalization of the link is to equalize the link at each one of the plurality of defined data rates mutually supported by the port and the endpoint device when the equalization bypass mode is advertised as not supported by one or both of the port and the endpoint device.

14. The apparatus of claim 12, wherein the plurality of data rates corresponds to a plurality of generations of a Peripheral Component Interconnect Express (PCIe)-based protocol.

15. The apparatus of claim 12, wherein the protocol circuitry is further to determine a particular one of the plurality of different protocols to use during an active link state based on the training of the link.

16. The apparatus of claim 15, wherein the protocol circuitry is further to prepare data to send on the link during the active link state according to the particular protocol.

17. A method comprising:
receiving a first training sequence during training of a link, wherein the link couples a first device to a second device, and the first training sequence comprises a first field to identify a highest supported speed of the second device and a second field to identify that the second device supports equalization bypass;
sending a second training sequence from the first device to the second device during the training of the link, wherein the second training sequence comprises a third field to identify a highest supported speed of the first device and a fourth field to identify that the first device also supports the equalization bypass;
determining, from the training of the link, which of a plurality of different interconnect protocols is to be used during an active state of the link, wherein each of the first and second devices support each of the plurality of different interconnect protocols; and
performing equalization of the link according to the equalization bypass, wherein equalization according to the equalization bypass skips equalization for another lower speed supported by both the first device and the second device in favor of equalization at a higher speed supported by both the first device and the second device, wherein the higher speed is determined based on the respective highest supported speeds advertised in the first and second training sequences.

18. The method of claim 17, wherein the highest supported speed of the first device is different from the highest supported speed of the second device, and the higher speed comprises the lower of the highest supported speed of the first device or the highest supported speed of the second device.

19. A method comprising:
   entering a particular link training state during training of a link, wherein the link couples a host device to an endpoint device;
   sending a first training sequence to the endpoint device in the particular link training state, wherein the first training sequence comprises a first field to identify a highest one of a plurality of defined data rates for the link supported by the host device and further comprises a second field to identify that the host device supports an equalization bypass mode;
   receiving a second training sequence in the particular link training state from the endpoint device, wherein the second training sequence comprises a third field to identify a highest one of the plurality of defined data rates supported by the endpoint device and further comprises a fourth field to identify that the endpoint device also supports the equalization bypass mode;
   determining that a particular one of the plurality of defined data rates comprises a highest rate supported by both the host device and the endpoint device;
   determining a particular one of a plurality of different protocols supported by both the host device and the endpoint device to apply in an active link state of the link based on the training of the link; and
   performing equalization of the link in the equalization bypass mode based on support of the equalization bypass mode by both the host device and the endpoint device, wherein equalization at data rates in the plurality of data rates below the particular data rate are to be skipped in the equalization bypass mode.

20. The method of claim 19, wherein the particular link training state comprises a configuration state.

21. A system comprising:
   a host device comprising a processor core; and
   an endpoint device coupled to the host device by a link, wherein the endpoint device comprises:
      physical layer circuitry to implement a common physical layer comprising a Peripheral Component Interconnect Express-based electrical sub-block; and
      protocol circuitry to support a plurality of different protocols, the common physical layer is to be used to send data according to the plurality of different protocols, and the protocol circuitry is to:
         receive a first training sequence during training of the link from the host device, wherein the first training sequence comprises a first field to identify a highest supported data rate of the host device and a second field to identify that the host device supports equalization bypass; and
         send a second training sequence from the endpoint device to the host device during the training of the link, wherein the second training sequence comprises a third field to identify a highest supported data rate of the endpoint device and a fourth field to identify that the endpoint device also supports the equalization bypass; and
      wherein the host device and endpoint device are to perform equalization of the link according to the equalization bypass based on both the host device and the endpoint device advertising support of the equalization bypass in the first and second training sequences, wherein the equalization according to the equalization bypass skips equalization for another lower data rate supported by both the endpoint device and the host device in favor of equalization at a data rate supported by both the endpoint device and the host device, wherein the higher data rate is determined based on the respective highest supported data rates advertised in the first and second training sequences.

22. The system of claim 21, further comprising a retimer device positioned on the link between the host device and the endpoint device to extend a physical length of the link, wherein one of the first or second training sequence comprises a particular field to identify presence of the retimer device on the link.

23. The system of claim 21, wherein the endpoint device comprises an accelerator device.

24. The system of claim 21, wherein the endpoint device comprises a memory device.

25. The system of claim 21, wherein the plurality of different protocols comprises a Peripheral Component Interconnect Express (PCIe)-based protocol and a particular protocol comprising coherency, memory, and input/output (I/O) subprotocols.

* * * * *